(12) United States Patent
Yuasa et al.

(10) Patent No.: US 10,919,339 B2
(45) Date of Patent: Feb. 16, 2021

(54) BICYCLE HUB ASSEMBLY AND BICYCLE DRIVE TRAIN ASSEMBLY

(71) Applicant: SHIMANO INC., Sakai (JP)

(72) Inventors: Koji Yuasa, Sakai (JP); Takafumi Nishino, Sakai (JP); Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 383 days.

(21) Appl. No.: 15/686,173

(22) Filed: Aug. 25, 2017

(65) Prior Publication Data
US 2018/0333986 A1 Nov. 22, 2018

Related U.S. Application Data

(63) Continuation-in-part of application No. 15/602,011, filed on May 22, 2017, now abandoned.

(51) Int. Cl.
*B60B 27/04* (2006.01)
*B62M 9/121* (2010.01)
(Continued)

(52) U.S. Cl.
CPC .......... *B60B 27/04* (2013.01); *B60B 27/0026* (2013.01); *B60B 27/0052* (2013.01);
(Continued)

(58) Field of Classification Search
CPC ... B60B 27/04; B60B 27/047; B60B 27/0052; B60B 27/023; B60B 27/0026; B62M 9/10; B62M 9/12; B62M 9/121
See application file for complete search history.

(56) References Cited

U.S. PATENT DOCUMENTS

| 5,480,357 A * | 1/1996 | Liang ................. B62M 9/10 474/160 |
| 6,371,252 B1 | 4/2002 | Kanehisa |

(Continued)

FOREIGN PATENT DOCUMENTS

| CN | 1403339 | 3/2003 |
| CN | 105835619 | 8/2016 |

OTHER PUBLICATIONS

Zee Rear Freehub for Disc Brake, Model No. FH-M645, https://web.archive.org/web/20150905181629/http://bike.shimano.com/content/sac-bike/en/home/mtb1/wheels---hubs/rear-hubs/fh-m645.html, Sep. 5, 2015. (Year: 2015).*

*Primary Examiner* — Kip T Kotter
(74) *Attorney, Agent, or Firm* — Mori & Ward, LLP

(57) ABSTRACT

A bicycle hub assembly comprises a hub axle, a hub body, a sprocket support structure, and a brake-rotor support structure. The sprocket support structure includes a first torque-transmitting profile and a first externally-threaded portion. The first torque-transmitting profile is configured to transmit a rotational force between the sprocket support structure and a bicycle sprocket assembly. The first externally-threaded portion is configured to threadedly engage with a first internally-threaded portion of a first lock member. The brake-rotor support structure includes a radially external surface, a radially internal surface, and a second torque-transmitting profile configured to transmit a rotational force between the brake-rotor support structure and a brake rotor. The second torque-transmitting profile is provided on the radially external surface.

54 Claims, 10 Drawing Sheets

(51) Int. Cl.
  *B60B 27/02* (2006.01)
  *F16H 57/00* (2012.01)
  *B60B 27/00* (2006.01)
  *B62L 1/00* (2006.01)
  *B62M 9/12* (2006.01)

(52) U.S. Cl.
  CPC ............ *B60B 27/023* (2013.01); *B62L 1/005* (2013.01); *B62M 9/12* (2013.01); *B62M 9/121* (2013.01); *F16H 57/0025* (2013.01)

(56) References Cited

U.S. PATENT DOCUMENTS

| | | | |
|---|---|---|---|
| 9,855,794 B1* | 1/2018 | Nakajima | B60B 27/023 |
| 2005/0139444 A1* | 6/2005 | Kanehisa | B60B 27/0005 |
| | | | 192/64 |
| 2005/0230199 A1* | 10/2005 | Takizawa | B62L 1/005 |
| | | | 188/218 XL |
| 2007/0194620 A1 | 8/2007 | Kanehisa | |
| 2007/0240945 A1* | 10/2007 | Hirotomi | B60B 27/0052 |
| | | | 188/26 |
| 2008/0004143 A1* | 1/2008 | Kanehisa | B62M 9/10 |
| | | | 474/160 |
| 2008/0157585 A1* | 7/2008 | Meggiolan | B60B 27/0005 |
| | | | 301/110.5 |
| 2009/0008987 A1* | 1/2009 | Hoogendoorn | B60B 27/0052 |
| | | | 301/110.5 |
| 2013/0017914 A1 | 1/2013 | Braedt | |
| 2016/0167737 A1* | 6/2016 | Tokuyama | B62M 9/10 |
| | | | 474/160 |
| 2016/0223033 A1 | 8/2016 | Fujita et al. | |
| 2016/0362159 A1 | 12/2016 | Braedt | |
| 2017/0057598 A1 | 3/2017 | Thrash et al. | |

* cited by examiner

| SPROCKET | TOTAL TOOTH NUMBER | | INDIVIDUAL PERCENTAGE GEAR STAGE STEP [%] | AVERAGE PERCENTAGE GEAR STAGE STEP [%] | ENTIRE GEAR RANGE [%] |
|---|---|---|---|---|---|
| SP12 | TN12 | 48 | | 15.3 | 480.0 |
| SP11 | TN11 | 42 | 14.3 | | |
| SP10 | TN10 | 37 | 13.5 | | |
| SP9 | TN9 | 33 | 12.1 | | |
| SP8 | TN8 | 29 | 13.8 | | |
| SP7 | TN7 | 25 | 16.0 | | |
| SP6 | TN6 | 22 | 13.6 | | |
| SP5 | TN5 | 19 | 15.8 | | |
| SP4 | TN4 | 16 | 18.8 | | |
| SP3 | TN3 | 14 | 14.3 | | |
| SP2 | TN2 | 12 | 16.7 | | |
| SP1 | TN1 | 10 | 20.0 | | |

FIG. 7

BICYCLE HUB ASSEMBLY AND BICYCLE DRIVE TRAIN ASSEMBLY

CROSS-REFERENCE TO RELATED APPLICATIONS

The present application is a continuation-in-part application of the U.S. patent application Ser. No. 15/602,011 filed May 22, 2017. The contents of this application are incorporated herein by reference in their entirety.

BACKGROUND OF THE INVENTION

Field of the Invention

The present invention relates to a bicycle hub assembly and a bicycle drive train assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a hub assembly.

SUMMARY OF THE INVENTION

In accordance with a first aspect of the present invention, a bicycle hub assembly comprises a hub axle, a hub body, a sprocket support structure, and a brake-rotor support structure. The hub body is rotatably supported on the hub axle about a rotational center axis of the bicycle hub assembly. The hub body has a first body end and a second body end opposite to the first body end in an axial direction with respect to the rotational center axis. The sprocket support structure includes a first torque-transmitting profile and a first externally-threaded portion. The first torque-transmitting profile is configured to transmit a rotational force between the sprocket support structure and a bicycle sprocket assembly. The first externally-threaded portion is configured to threadedly engage with a first internally-threaded portion of a first lock member. The first torque-transmitting profile is closer to the first body end than the first externally-threaded portion in the axial direction. The brake-rotor support structure includes a radially external surface, a radially internal surface, and a second torque-transmitting profile configured to transmit a rotational force between the brake-rotor support structure and a brake rotor. The second torque-transmitting profile is provided on the radially external surface.

With the bicycle hub assembly according to the first aspect, it is possible to easily attach and detach the brake rotor to and from the bicycle hub assembly and to mount the bicycle sprocket assembly having a wide gear range to the bicycle hub assembly.

In accordance with a second aspect of the present invention, the bicycle hub assembly according to the first aspect further comprises the first lock member configured to prevent an axial movement of the bicycle sprocket assembly relative to the sprocket support structure in a state where the first lock member is attached to the sprocket support structure.

With the bicycle hub assembly according to the second aspect, it is possible to firmly secure the bicycle sprocket assembly to the bicycle hub assembly in the axial direction with the first lock member.

In accordance with a third aspect of the present invention, the bicycle hub assembly according to the first or second aspect further comprises a second lock member configured to prevent an axial movement of the brake rotor relative to the brake-rotor support structure in a state where the second lock member is attached to the brake-rotor support structure.

With the bicycle hub assembly according to the third aspect, it is possible to firmly secure the brake rotor to the bicycle hub assembly in the axial direction with the second lock member.

In accordance with a fourth aspect of the present invention, the bicycle hub assembly according to the third aspect is configured so that the brake-rotor support structure includes a second internally-threaded portion provided on the radially internal surface. The second lock member includes a second externally-threaded portion configured to threadedly engage with the second internally-threaded portion of the sprocket support structure.

With the bicycle hub assembly according to the fourth aspect, the arrangement of the second internally-threaded portion and the second externally-threaded portion reduces an axial length of the brake-rotor support structure. This makes the bicycle hub assembly compact.

In accordance with a fifth aspect of the present invention, the bicycle hub assembly according to any one of the first to fourth aspects is configured so that the first torque-transmitting profile includes a first splined portion configured to engage with a sprocket splined portion of the bicycle sprocket assembly.

With the bicycle hub assembly according to the fifth aspect, the first splined portion allows the bicycle hub assembly to transmit a higher torque between the bicycle hub assembly and the bicycle sprocket assembly.

In accordance with a sixth aspect of the present invention, the bicycle hub assembly according to any one of the first to fifth aspects is configured so that the second torque-transmitting profile includes a second splined portion configured to engage with a rotor splined portion of the brake rotor.

With the bicycle hub assembly according to the sixth aspect, the second splined portion allows the bicycle hub assembly to transmit a higher torque between the bicycle hub assembly and the brake rotor.

In accordance with a seventh aspect of the present invention, the bicycle hub assembly according to any one of the first to sixth aspects is configured so that the first torque-transmitting profile has a first external diameter. The second torque-transmitting profile has a second external diameter that is larger than the first external diameter.

With the bicycle hub assembly according to the seventh aspect, the second external diameter saves a weight of the sprocket support structure.

In accordance with an eighth aspect of the present invention, the bicycle hub assembly according to the seventh aspect is configured so that the first externally-threaded portion has a third external diameter that is smaller than the first external diameter.

With the bicycle hub assembly according to the eighth aspect, third external diameter enables attachment of a smaller sprocket (e.g., a sprocket having 10 or less teeth) to the bicycle hub assembly. This makes a gear range of the bicycle sprocket assembly wider.

In accordance with a ninth aspect of the present invention, the bicycle hub assembly according to any one of the first to eighth aspects is configured so that the first torque-transmitting profile has a first external diameter that ranges from 34 mm to 35 mm.

With the bicycle hub assembly according to the ninth aspect, the first external diameter saves a weight of the sprocket support structure with enabling a higher torque transmission between the sprocket support structure and the bicycle sprocket assembly.

In accordance with a tenth aspect of the present invention, the bicycle hub assembly according to any one of the first to ninth aspects is configured so that the second torque-transmitting profile has a second external diameter that ranges from 35 mm to 36 mm.

With the bicycle hub assembly according to the tenth aspect, the second external diameter saves a weight of the brake-rotor support structure with enabling a higher torque transmission between the brake-rotor support structure and the brake rotor.

In accordance with an eleventh aspect of the present invention, the bicycle hub assembly according to any one of the first to tenth aspects is configured so that the first torque-transmitting profile has a first axial length. The second torque-transmitting profile has a second axial length that is larger than the first axial length.

With the bicycle hub assembly according to the eleventh aspect, the first axial length saves a weight of the sprocket support structure with enabling a higher torque transmission between the brake-rotor support structure and the brake rotor and the brake rotor.

In accordance with a twelfth aspect of the present invention, the bicycle hub assembly according to the eleventh aspect is configured so that the first externally-threaded portion has a third axial length that is larger than the first axial length.

With the bicycle hub assembly according to the twelfth aspect, it is possible to firmly secure the bicycle sprocket assembly to the bicycle hub assembly with saving a weight of the sprocket support structure.

In accordance with a thirteenth aspect of the present invention, the bicycle hub assembly according to any one of the first to twelfth aspects is configured so that the first torque-transmitting profile has a first axial length. The second torque-transmitting profile has a second axial length. The ratio of the first axial length to the second axial length ranges from 1 to 2.

With the bicycle hub assembly according to the thirteenth aspect, it is possible to save a weight of the sprocket support structure with enabling a higher torque transmission between the brake-rotor support structure and the brake rotor.

In accordance with a fourteenth aspect of the present invention, the bicycle hub assembly according to any one of the first to thirteenth aspects is configured so that the first torque-transmitting profile has a first axial length that ranges from 5 mm to 6 mm.

With the bicycle hub assembly according to the fourteenth aspect, it is possible to save a weight of the sprocket support structure with certainly transmitting a torque between the sprocket support structure and the bicycle sprocket assembly.

In accordance with a fifteenth aspect of the present invention, the bicycle hub assembly according to any one of the first to fourteenth aspects is configured so that the second torque-transmitting profile has a second axial length that ranges from 10 mm to 11 mm.

With the bicycle hub assembly according to the fifteenth aspect, it is possible to save a weight of the brake-rotor support structure with certainly transmitting a torque between the brake-rotor support structure and the brake rotor.

In accordance with a sixteenth aspect of the present invention, the bicycle hub assembly according to any one of the first to fifteenth aspects is configured so that the sprocket support structure is closer to the first body end than the brake-rotor support structure in the axial direction.

With the bicycle hub assembly according to the sixteenth aspect, it is possible to easily attach and detach the brake rotor to and from the bicycle hub assembly and to mount the bicycle sprocket assembly having a wider gear range to the bicycle hub assembly.

In accordance with a seventeenth aspect of the present invention, a bicycle drive train assembly comprises a bicycle sprocket assembly and a bicycle hub assembly. The bicycle sprocket assembly includes a smallest sprocket and a largest sprocket. The smallest sprocket has a first total tooth number that is equal to or smaller than 10. The largest sprocket has a second total tooth number that is equal to or larger than 46. The bicycle hub assembly includes a hub axle, a hub body, a sprocket support structure, and a brake-rotor support structure. The hub body is rotatably supported on the hub axle about a rotational center axis of the bicycle hub assembly. The hub body has a first body end and a second body end opposite to the first body end in an axial direction with respect to the rotational center axis. The sprocket support structure is configured to support the bicycle sprocket assembly. The sprocket support structure includes a first torque-transmitting profile configured to transmit a rotational force between the sprocket support structure and the bicycle sprocket assembly. The brake-rotor support structure includes a radially external surface, a radially internal surface, and a second torque-transmitting profile. The second torque-transmitting profile is configured to transmit a rotational force between the brake-rotor support structure and a brake rotor. The second torque-transmitting profile is provided on the radially external surface. The seventeenth aspect can be combined with any one of the first to sixteenth aspects.

With the bicycle drive train assembly according to the seventeenth aspect, it is possible to easily attach and detach the brake rotor to and from the bicycle hub assembly and to mount the bicycle sprocket assembly having a wide gear range to the bicycle hub assembly.

In accordance with an eighteenth aspect of the present invention, the bicycle drive train assembly according to the seventeenth aspect is configured so that the sprocket support structure includes a first externally-threaded portion configured to threadedly engage with a first internally-threaded portion of a first lock member. The first torque-transmitting profile is closer to the first body end than the first externally-threaded portion in the axial direction.

With the bicycle drive train assembly according to the eighteenth aspect, it is possible to provide a bicycle hub assembly with a sprocket support structure which is lightweight and to mount the bicycle sprocket assembly having a wider gear range to the bicycle hub assembly.

In accordance with a nineteenth aspect of the present invention, the bicycle drive train assembly according to the seventeenth or eighteenth aspect is configured so that the bicycle hub assembly comprises the first lock member configured to prevent an axial movement of the bicycle sprocket assembly relative to the sprocket support structure in a state where the first lock member is attached to the sprocket support structure.

With the bicycle drive train assembly according to the nineteenth aspect, it is possible to firmly secure the bicycle sprocket assembly to the bicycle hub assembly in the axial direction with the first lock member.

In accordance with a twentieth aspect of the present invention, the bicycle drive train assembly according to any one of the seventeenth to nineteenth aspects is configured so that the bicycle hub assembly comprises a second lock member configured to prevent an axial movement of the brake rotor relative to the brake-rotor support structure in a state where the second lock member is attached to the brake-rotor support structure.

With the bicycle drive train assembly according to the twentieth aspect, it is possible to firmly secure the brake rotor to the bicycle hub assembly in the axial direction with the second lock member.

In accordance with a twenty-first aspect of the present invention, the bicycle drive train assembly according to the twentieth aspect is configured so that the brake-rotor support structure includes a second internally-threaded portion provided on the radially internal surface. The second lock member includes a second externally-threaded portion configured to threadedly engage with the second internally-threaded portion of the sprocket support structure.

With the bicycle drive train assembly according to the twenty-first aspect, the arrangement of the second internally-threaded portion and the second externally-threaded portion reduces an axial length of the brake-rotor support structure. This makes the bicycle hub assembly compact.

In accordance with a twenty-second aspect of the present invention, the bicycle drive train assembly according to any one of the seventeenth to twenty-first aspects is configured so that the first torque-transmitting profile includes a first splined portion configured to engage with a sprocket splined portion of the bicycle sprocket assembly.

With the bicycle drive train assembly according to the twenty-second aspect, the first splined portion allows the bicycle hub assembly to transmit a higher torque between the bicycle hub assembly and the bicycle sprocket assembly.

In accordance with a twenty-third aspect of the present invention, the bicycle drive train assembly according to any one of the seventeenth to twenty-second aspects is configured so that the second torque-transmitting profile includes a second splined portion configured to engage with a rotor splined portion of the brake rotor.

With the bicycle drive train assembly according to the twenty-third aspect, the second splined portion allows the bicycle hub assembly to transmit a higher torque between the bicycle hub assembly and the brake rotor.

In accordance with a twenty-fourth aspect of the present invention, the bicycle drive train assembly according to any one of the seventeenth to twenty-third aspects is configured so that the second total tooth number is equal to or larger than 50.

With the bicycle drive train assembly according to the twenty-fourth aspect, it is possible to provide the bicycle drive train assembly having a wide gear range on a low gear side.

In accordance with a twenty-fifth aspect of the present invention, the bicycle drive train assembly according to any one of the seventeenth to twenty-fourth aspects is configured so that the bicycle sprocket assembly includes at least nine additional sprockets disposed between the smallest sprocket and the largest sprocket in the axial direction.

With the bicycle drive train assembly according to the twenty-fifth aspect, it is possible to provide the bicycle drive train assembly sufficiently having a wide gear range and a plurality of gear stages.

In accordance with a twenty-sixth aspect of the present invention, the bicycle drive train assembly according to any one of the seventeenth to twenty-fifth aspects is configured so that the bicycle sprocket assembly includes at least ten additional sprockets disposed between the smallest sprocket and the largest sprocket in the axial direction.

With the bicycle drive train assembly according to the twenty-sixth aspect, it is possible to provide the bicycle drive train assembly sufficiently having a wide gear range and a plurality of gear stages.

In accordance with a twenty-seventh aspect of the present invention, the bicycle drive train assembly according to any one of the seventeenth to twenty-sixth aspects is configured so that the sprocket support structure is closer to the first body end than the brake-rotor support structure in the axial direction.

With the bicycle drive train assembly according to the twenty-seventh aspect, it is possible to easily attach and detach the brake rotor to and from the bicycle hub assembly and to mount the bicycle sprocket assembly having a wide gear range to the bicycle hub assembly.

In accordance with a twenty-eighth aspect of the present invention, a bicycle drive train assembly comprises a bicycle sprocket assembly and a bicycle hub assembly. The bicycle sprocket assembly includes at least ten sprockets. The bicycle sprocket assembly has an entire gear range and an average percentage gear stage step. The entire gear range is equal to or higher than 350%. The average percentage gear stage step ranges from 15% to 30%. The bicycle hub assembly includes a hub axle, a hub body, a sprocket support structure, and a brake-rotor support structure. The hub body is rotatably supported on the hub axle about a rotational center axis of the bicycle hub assembly. The hub body has a first body end and a second body end opposite to the first body end in an axial direction with respect to the rotational center axis. The sprocket support structure is configured to support the bicycle sprocket assembly. The sprocket support structure includes a first torque-transmitting profile configured to transmit a rotational force between the sprocket support structure and the bicycle sprocket assembly. The brake-rotor support structure includes a radially external surface, a radially internal surface, and a second torque-transmitting profile. The second torque-transmitting profile is configured to transmit a rotational force between the brake-rotor support structure and a brake rotor. The second torque-transmitting profile is provided on the radially external surface. The twenty-eighth aspect can be combined with any one of the first to twenty-seventh aspects.

With the bicycle drive train assembly according to the twenty-eighth aspect, it is possible to easily attach and detach the brake rotor to and from the bicycle hub assembly and to mount the bicycle sprocket assembly having a wide gear range to the bicycle hub assembly.

In accordance with a twenty-ninth aspect of the present invention, the bicycle drive train assembly according to the twenty-eighth aspect is configured so that the sprocket support structure includes a first externally-threaded portion configured to threadedly engage with a first internally-threaded portion of a first lock member. The first externally-threaded portion is disposed axially outwardly from the first torque-transmitting profile in the axial direction.

With the bicycle drive train assembly according to the twenty-ninth aspect, it is possible to provide a bicycle hub assembly with a sprocket support structure which is lightweight and to mount the bicycle sprocket assembly having a wider gear range to the bicycle hub assembly.

In accordance with a thirtieth aspect of the present invention, the bicycle drive train assembly according to the twenty-eighth or twenty-ninth aspect is configured so that the bicycle hub assembly comprises the first lock member configured to prevent an axial movement of the bicycle sprocket assembly relative to the sprocket support structure in a state where the first lock member is attached to the sprocket support structure.

With the bicycle drive train assembly according to the thirtieth aspect, it is possible to firmly secure the bicycle sprocket assembly to the bicycle hub assembly in the axial direction with the first lock member.

In accordance with a thirty-first aspect of the present invention, the bicycle drive train assembly according to any one of the twenty-eighth to thirtieth aspects is configured so that the bicycle hub assembly comprises a second lock member configured to prevent an axial movement of the brake rotor relative to the brake-rotor support structure in a state where the second lock member is attached to the brake-rotor support structure.

With the bicycle drive train assembly according to the thirty-first aspect, it is possible to firmly secure the brake rotor to the bicycle hub assembly in the axial direction with the second lock member.

In accordance with a thirty-second aspect of the present invention, the bicycle drive train assembly according to the thirty-first aspect is configured so that the brake-rotor support structure includes a second internally-threaded portion provided on the radially internal surface. The second lock member includes a second externally-threaded portion configured to threadedly engage with the second internally-threaded portion of the sprocket support structure.

With the bicycle drive train assembly according to the thirty-second aspect, the arrangement of the second internally-threaded portion and the second externally-threaded portion reduces an axial length of the brake-rotor support structure. This makes the bicycle hub assembly compact.

In accordance with a thirty-third aspect of the present invention, the bicycle drive train assembly according to any one of the twenty-eighth to thirty-second aspects is configured so that the first torque-transmitting profile includes a first splined portion configured to engage with a sprocket splined portion of the bicycle sprocket assembly.

With the bicycle drive train assembly according to the thirty-third aspect, the first splined portion allows the bicycle hub assembly to transmit a higher torque between the bicycle hub assembly and the bicycle sprocket assembly.

In accordance with a thirty-fourth aspect of the present invention, the bicycle drive train assembly according to any one of the twenty-eighth to thirty-third aspects is configured so that the second torque-transmitting profile includes a second splined portion configured to engage with a rotor splined portion of the brake rotor.

With the bicycle drive train assembly according to the thirty-fourth aspect, the second splined portion allows the bicycle hub assembly to transmit a higher torque between the bicycle hub assembly and the brake rotor.

In accordance with a thirty-fifth aspect of the present invention, the bicycle drive train assembly according to any one of the twenty-eighth to thirty-fourth aspects is configured so that the entire gear range of the bicycle sprocket assembly is equal to or higher than 400%.

With the bicycle drive train assembly according to the thirty-fifth aspect, it is possible to provide the bicycle drive train assembly having a wider gear range.

In accordance with a thirty-sixth aspect of the present invention, the bicycle drive train assembly according to any one of the twenty-eighth to thirty-fifth aspects is configured so that the average percentage gear stage step of the bicycle sprocket assembly ranges from 20% to 30%.

With the bicycle drive train assembly according to the thirty-sixth aspect, it is possible to provide the bicycle drive train assembly having a wider gear range with enabling an effective shift operation.

In accordance with a thirty-seventh aspect of the present invention, the bicycle drive train assembly according to any one of the twenty-eighth to thirty-sixth aspects is configured so that the bicycle sprocket assembly has individual percentage gear stage steps ranging from 15% to 35%.

With the bicycle drive train assembly according to the thirty-seventh aspect, it is possible to provide the bicycle drive train assembly having a wider gear range with enabling an effective shift operation.

In accordance with a thirty-eighth aspect of the present invention, the bicycle drive train assembly according to any one of the twenty-eighth to thirty-seventh aspects is configured so that the sprocket support structure is closer to the first body end than the brake-rotor support structure in the axial direction.

With the bicycle drive train assembly according to the thirty-eighth aspect, it is possible to easily attach and detach the brake rotor to and from the bicycle hub assembly and to mount the bicycle sprocket assembly having a wide gear range to the bicycle hub assembly.

In accordance with a thirty-ninth aspect of the present invention, a bicycle drive train assembly comprises a bicycle sprocket assembly and a bicycle hub assembly. The bicycle sprocket assembly includes a smallest sprocket having a smallest-sprocket external diameter. The bicycle hub assembly includes a hub axle, a hub body, a sprocket support structure, and a brake-rotor support structure. The hub body is rotatably supported on the hub axle about a rotational center axis of the bicycle hub assembly. The hub body has a first body end and a second body end opposite to the first body end in an axial direction with respect to the rotational center axis. The sprocket support structure is configured to support the bicycle sprocket assembly. The sprocket support structure includes a first torque-transmitting profile configured to transmit a rotational force between the sprocket support structure and the bicycle sprocket assembly. The first torque-transmitting profile has a first external diameter. The brake-rotor support structure includes a radially external surface, a radially internal surface, and a second torque-transmitting profile. The second torque-transmitting profile is configured to transmit a rotational force between the brake-rotor support structure and a brake rotor. The second torque-transmitting profile is provided on the radially external surface and has a second external diameter that is larger than the smallest-sprocket external diameter. The thirty-ninth aspect can be combined with any one of the first to thirty-eighth aspects.

With the bicycle drive train assembly according to the thirty-ninth aspect, it is possible to provide the bicycle drive train assembly having a wide gear range on a top gear side with enabling a high braking performance.

In accordance with a fortieth aspect of the present invention, the bicycle drive train assembly according to the thirty-ninth aspect is configured so that the sprocket support structure includes a first externally-threaded portion configured to threadedly engage with a first internally-threaded portion of a first lock member. The first externally-threaded portion is disposed axially outwardly from the first torque-transmitting profile in the axial direction.

With the bicycle drive train assembly according to the fortieth aspect, it is possible to provide a bicycle hub assembly with a sprocket support structure which is lightweight and to mount the bicycle sprocket assembly having a wider gear range to the bicycle hub assembly.

In accordance with a forty-first aspect of the present invention, the bicycle drive train assembly according to the thirty-ninth or fortieth aspect is configured so that the bicycle hub assembly comprises the first lock member configured to prevent an axial movement of the bicycle sprocket assembly relative to the sprocket support structure in a state where the first lock member is attached to the sprocket support structure.

With the bicycle drive train assembly according to the forty-first aspect, it is possible to firmly secure the bicycle sprocket assembly to the bicycle hub assembly in the axial direction with the first lock member.

In accordance with a forty-second aspect of the present invention, the bicycle drive train assembly according to any one of the thirty-ninth to forty-first aspects is configured so that the bicycle hub assembly comprises a second lock member configured to prevent an axial movement of the brake rotor relative to the brake-rotor support structure in a state where the second lock member is attached to the brake-rotor support structure.

With the bicycle drive train assembly according to the forty-second aspect, it is possible to firmly secure the brake rotor to the bicycle hub assembly in the axial direction with the second lock member.

In accordance with a forty-third aspect of the present invention, the bicycle drive train assembly according to the forty-second aspect is configured so that the brake-rotor support structure includes a second internally-threaded portion provided on the radially internal surface. The second lock member includes a second externally-threaded portion configured to threadedly engage with the second internally-threaded portion of the sprocket support structure.

With the bicycle drive train assembly according to the forty-third aspect, the arrangement of the second internally-threaded portion and the second externally-threaded portion reduces an axial length of the brake-rotor support structure. This makes the bicycle hub assembly compact.

In accordance with a forty-fourth aspect of the present invention, the bicycle drive train assembly according to any one of the thirty-ninth to forty-third aspects is configured so that the first torque-transmitting profile includes a first splined portion configured to engage with a sprocket splined portion of the bicycle sprocket assembly.

With the bicycle drive train assembly according to the forty-fourth aspect, the first splined portion allows the bicycle hub assembly to transmit a higher torque between the bicycle hub assembly and the bicycle sprocket assembly.

In accordance with a forty-fifth aspect of the present invention, the bicycle drive train assembly according to any one of the thirty-ninth to forty-fourth aspects is configured so that the second torque-transmitting profile includes a second splined portion configured to engage with a rotor splined portion of the brake rotor.

With the bicycle drive train assembly according to the forty-fifth aspect, the second splined portion allows the bicycle hub assembly to transmit a higher torque between the bicycle hub assembly and the brake rotor.

In accordance with a forty-sixth aspect of the present invention, the bicycle drive train assembly according to any one of the thirty-ninth to forty-fifth aspects is configured so that the second external diameter is larger than the first external diameter.

With the bicycle drive train assembly according to the forty-sixth aspect, it is possible to save a weight of the sprocket support structure with enabling a higher torque transmission between the brake-rotor support structure and the brake rotor.

In accordance with a forty-seventh aspect of the present invention, the bicycle drive train assembly according to any one of the thirty-ninth to forty-sixth aspects is configured so that the sprocket support structure is closer to the first body end than the brake-rotor support structure in the axial direction.

With the bicycle drive train assembly according to the forty-seventh aspect, it is possible to provide the bicycle drive train assembly having a wider gear range on a top gear side with enabling a high braking performance.

In accordance with a forty-eighth aspect of the present invention, a bicycle drive train assembly comprises a bicycle sprocket assembly, a brake rotor, and a bicycle hub assembly. The bicycle sprocket assembly includes a largest sprocket having a largest-sprocket external diameter. The brake rotor has a rotor external diameter. The bicycle hub assembly includes a hub axle, a hub body, a sprocket support structure, and a brake-rotor support structure. The hub body is rotatably supported on the hub axle about a rotational center axis of the bicycle hub assembly. The hub body has a first body end and a second body end opposite to the first body end in an axial direction of the rotational center axis. The sprocket support structure is configured to support the bicycle sprocket assembly. The sprocket support structure includes a first torque-transmitting profile configured to transmit a rotational force between the sprocket support structure and the bicycle sprocket assembly. The brake-rotor support structure includes a radially external surface, a radially internal surface, and a second torque-transmitting profile. The second torque-transmitting profile is configured to transmit a rotational force between the brake-rotor support structure and the brake rotor. The second torque-transmitting profile is provided on the radially external surface. The brake rotor has a rotor external diameter that is smaller than the largest-sprocket external diameter. The forty-eighth aspect can be combined with any one of the first to forty-seventh aspects.

With the bicycle drive train assembly according to the forty-eighth aspect, it is possible to provide the bicycle drive train assembly having a wide gear range on a low gear side with enabling a high braking performance.

In accordance with a forty-ninth aspect of the present invention, the bicycle drive train assembly according to the forty-eighth aspect is configured so that the sprocket support structure includes a first externally-threaded portion configured to threadedly engage with a first internally-threaded portion of a first lock member. The first externally-threaded portion is disposed axially outwardly from the first torque-transmitting profile in the axial direction.

With the bicycle drive train assembly according to the forty-ninth aspect, it is possible to provide a bicycle hub assembly with a sprocket support structure which is lightweight and to mount the bicycle sprocket assembly having a wider gear range to the bicycle hub assembly.

In accordance with a fiftieth aspect of the present invention, the bicycle drive train assembly according to the forty-eighth or forty-ninth aspect is configured so that the bicycle hub assembly comprises the first lock member configured to prevent an axial movement of the bicycle sprocket assembly relative to the sprocket support structure in a state where the first lock member is attached to the sprocket support structure.

With the bicycle drive train assembly according to the fiftieth aspect, it is possible to firmly secure the bicycle sprocket assembly to the bicycle hub assembly in the axial direction with the first lock member.

In accordance with a fifty-first aspect of the present invention, the bicycle drive train assembly according to any one of the forty-eighth to fiftieth aspects is configured so that the bicycle hub assembly comprises a second lock member configured to prevent an axial movement of the brake rotor relative to the brake-rotor support structure in a state where the second lock member is attached to the brake-rotor support structure.

With the bicycle drive train assembly according to the fifty-first aspect, it is possible to firmly secure the brake rotor to the bicycle hub assembly in the axial direction with the second lock member.

In accordance with a fifty-second aspect of the present invention, the bicycle drive train assembly according to the fifty-first aspect is configured so that the brake-rotor support structure includes a second internally-threaded portion provided on the radially internal surface. The second lock member includes a second externally-threaded portion configured to threadedly engage with the second internally-threaded portion of the sprocket support structure.

With the bicycle drive train assembly according to the fifty-second aspect, the arrangement of the second internally-threaded portion and the second externally-threaded portion reduces an axial length of the brake-rotor support structure. This makes the bicycle hub assembly compact.

In accordance with a fifty-third aspect of the present invention, the bicycle drive train assembly according to any one of the forty-eighth to fifty-second aspects is configured so that the first torque-transmitting profile includes a first splined portion configured to engage with a sprocket splined portion of the bicycle sprocket assembly.

With the bicycle drive train assembly according to the fifty-third aspect, the first splined portion allows the bicycle hub assembly to transmit a higher torque between the bicycle hub assembly and the bicycle sprocket assembly.

In accordance with a fifty-fourth aspect of the present invention, the bicycle drive train assembly according to any one of the forty-eighth to fifty-third aspects is configured so that the second torque-transmitting profile includes a second splined portion configured to engage with a rotor splined portion of the brake rotor.

With the bicycle drive train assembly according to the fifty-fourth aspect, the second splined portion allows the bicycle hub assembly to transmit a higher torque between the bicycle hub assembly and the brake rotor.

In accordance with a fifty-fifth aspect of the present invention, the bicycle drive train assembly according to any one of the forty-eighth to fifty-fourth aspects is configured so that the sprocket support structure is closer to the first body end than the brake-rotor support structure in the axial direction.

With the bicycle drive train assembly according to the fifty-fifth aspect, it is possible to provide the bicycle drive train assembly having a wider gear range on a top gear side with enabling a high braking performance.

In accordance with a fifty-sixth aspect of the present invention, a bicycle hub assembly comprises a hub axle, a hub body, and a sprocket support structure. The hub body is rotatably supported on the hub axle about a rotational center axis of the bicycle hub assembly. The hub body has a first body end and a second body end opposite to the first body end in an axial direction with respect to the rotational center axis. The hub body includes a first spoke-mounting portion, a second spoke-mounting portion, and a first axial distance. The first spoke-mounting portion has a first axially outermost part. The second spoke-mounting portion has a second axially outermost part. The first axial distance is defined between the first axially outermost part of the first spoke-mounting portion and the second axially outermost part of the second spoke-mounting portion in the axial direction. The first axial distance is equal to or larger than 55 mm. The sprocket support structure is rotatably mounted on the hub axle about the rotational center axis. The sprocket support structure includes a first torque-transmitting profile and a first externally-threaded portion. The first torque-transmitting profile is configured to transmit a rotational force between the sprocket support structure and a bicycle sprocket assembly. The first externally-threaded portion is configured to threadedly engage with a first internally-threaded portion of a first lock member. The first torque-transmitting profile is closer to the first body end than the first externally-threaded portion in the axial direction. The fifty-sixth aspect can be combined with any one of the first to fifty-fifth aspects.

With the bicycle hub assembly according to the fifty-sixth aspect, the first axial length improves strength of a wheel including the bicycle hub assembly. Furthermore, the sprocket support structure allows the bicycle sprocket assembly having a lighter weight.

In accordance with a fifty-seventh aspect of the present invention, the bicycle hub assembly according to the fifty-sixth aspect is configured so that the first axial distance is equal to or larger than 60 mm.

With the bicycle hub assembly according to the fifty-seventh aspect, the first axial length further improves strength of a wheel including the bicycle hub assembly.

In accordance with a fifty-eighth aspect of the present invention, the bicycle hub assembly according to the fifty-sixth aspect is configured so that the first axial distance is equal to or larger than 65 mm.

With the bicycle hub assembly according to the fifty-eighth aspect, the first axial length further improves strength of a wheel including the bicycle hub assembly.

In accordance with a fifty-ninth aspect of the present invention, the bicycle hub assembly according to any one of the fifty-sixth to fifty-eighth aspects is configured so that the hub axle includes a first axial frame abutment surface, a second axial frame abutment surface, and a second axial distance. The first axial frame abutment surface is configured to abut against a first part of a bicycle frame in the axial direction in a state where the bicycle hub assembly is mounted to the bicycle frame. The second axial frame abutment surface is configured to abut against a second part of the bicycle frame in the axial direction in the state where the bicycle hub assembly is mounted to the bicycle frame. The second axial distance is defined between the first axial frame abutment surface and the second axial frame abutment surface in the axial direction. The second axial distance is equal to or larger than 140 mm.

With the bicycle hub assembly according to the fifty-ninth aspect, the second axial length makes the bicycle hub assembly attachable to a variety type of bicycle frame with obtaining the effect of the fifty-sixth aspect.

In accordance with a sixtieth aspect of the present invention, the bicycle hub assembly according to any one of the fifty-sixth to fifty-eighth aspects is configured so that the hub axle includes a first axial frame abutment surface, a second axial frame abutment surface, and a second axial distance. The first axial frame abutment surface is configured to abut against a first part of a bicycle frame in the axial direction in a state where the bicycle hub assembly is mounted to the bicycle frame. The second axial frame abutment surface is configured to abut against a second part of the bicycle frame in the axial direction in the state where the bicycle hub assembly is mounted to the bicycle frame. The second axial distance is defined between the first axial frame abutment surface and the second axial frame abutment surface in the axial direction, the second axial distance being equal to or larger than 145 mm.

With the bicycle hub assembly according to the sixtieth aspect, the second axial length improves a degree of freedom of choosing the first axial length and/or a wider range of the bicycle sprocket assembly, and enables the first axial length to lengthen so that more sprockets can be mounted to the bicycle hub assembly.

In accordance with a sixty-first aspect of the present invention, the bicycle hub assembly according to any one of the fifty-sixth to fifty-eighth aspects is configured so that the hub axle includes a first axial frame abutment surface, a second axial frame abutment surface, and a second axial distance. The first axial frame abutment surface is configured to abut against a first part of a bicycle frame in the axial direction in a state where the bicycle hub assembly is mounted to the bicycle frame. The second axial frame abutment surface is configured to abut against a second part of the bicycle frame in the axial direction in the state where the bicycle hub assembly is mounted to the bicycle frame. The second axial distance is defined between the first axial frame abutment surface and the second axial frame abutment surface in the axial direction. The second axial distance is equal to or larger than 147 mm.

With the bicycle hub assembly according to the sixty-first aspect, the second axial length further improves a degree of freedom of choosing the first axial length and/or a wider range of the bicycle sprocket assembly, and enables the first axial length to lengthen so that more sprockets can be mounted to the bicycle hub assembly.

In accordance with a sixty-second aspect of the present invention, the bicycle hub assembly according to any one of the fifty-sixth to sixty-first aspects further comprises the first lock member configured to prevent an axial movement of the bicycle sprocket assembly relative to the sprocket support structure in a state where the first lock member is attached to the sprocket support structure.

With the bicycle hub assembly according to the sixty-second aspect, it is possible to firmly secure the bicycle sprocket assembly to the bicycle hub assembly in the axial direction with the first lock member.

In accordance with a sixty-third aspect of the present invention, the bicycle hub assembly according to any one of the fifty-sixth to sixty-second aspects is configured so that the first torque-transmitting profile includes a first splined portion configured to engage with a sprocket splined portion of the bicycle sprocket assembly.

With the bicycle hub assembly according to the sixty-third aspect, the first splined portion allows the bicycle hub assembly to transmit a higher torque between the bicycle hub assembly and the bicycle sprocket assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 shows a total tooth number, an individual percentage gear stage step, an average percentage gear stage step, and an entire gear range of the bicycle sprocket assembly of the bicycle drive train assembly illustrated in FIG. 1.

DESCRIPTION OF THE EMBODIMENTS

Figure 1:
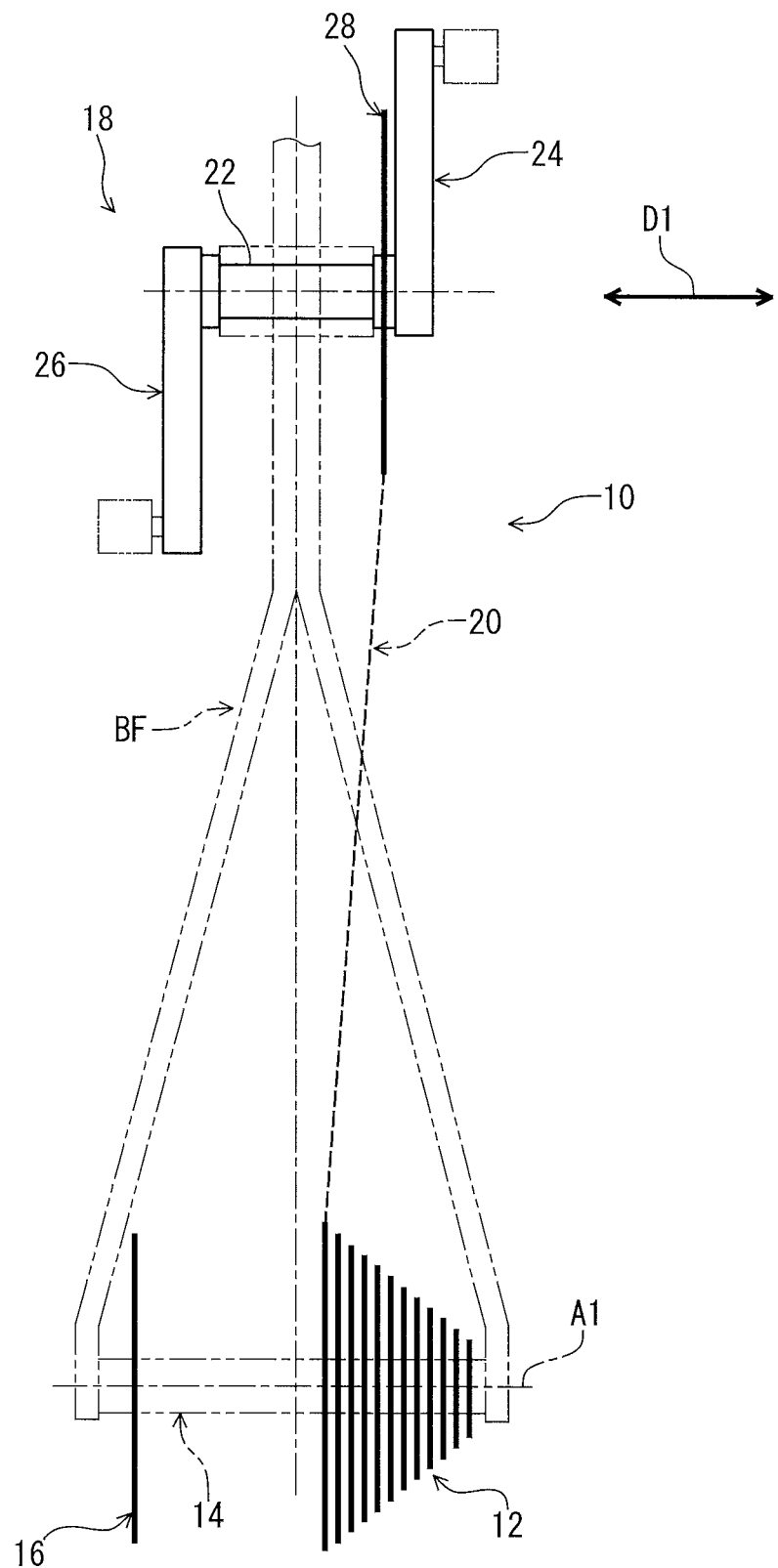
FIG. 1 is a schematic diagram of a bicycle drive train assembly in accordance with an embodiment.

The embodiment(s) will now be described with reference to the accompanying drawings, wherein like reference numerals designate corresponding or identical elements throughout the various drawings.

Referring initially to FIG. 1, a bicycle drive train assembly 10 in accordance with an embodiment comprises a bicycle sprocket assembly 12, a bicycle hub assembly 14, and a brake rotor 16. The bicycle sprocket assembly 12 is mounted on the bicycle hub assembly 14. The brake rotor 16 is mounted on the bicycle hub assembly 14. The bicycle drive train assembly 10 may further comprise a crank assembly 18 and a bicycle chain 20. The crank assembly 18 includes a crank axle 22, a right crank arm 24, a left crank arm 26, and a front sprocket 28. The right crank arm 24 and the left crank arm 26 are secured to the crank axle 22. The front sprocket 28 is secured to at least one of the crank axle 22 and the right crank arm 24. The bicycle chain 20 is engaged with the front sprocket 28 and the bicycle sprocket assembly 12 to transmit a pedaling force from the front sprocket 28 to the bicycle sprocket assembly 12. The crank assembly 18 includes the front sprocket 28 as a single sprocket. However, the crank assembly 18 can includes a plurality of front sprockets.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle (not shown) with facing a handlebar. Accordingly, these terms, as utilized to describe the bicycle drive train assembly 10, should be interpreted relative to the bicycle equipped with the bicycle drive train assembly 10 as used in an upright riding position on a horizontal surface.

Figure 2:
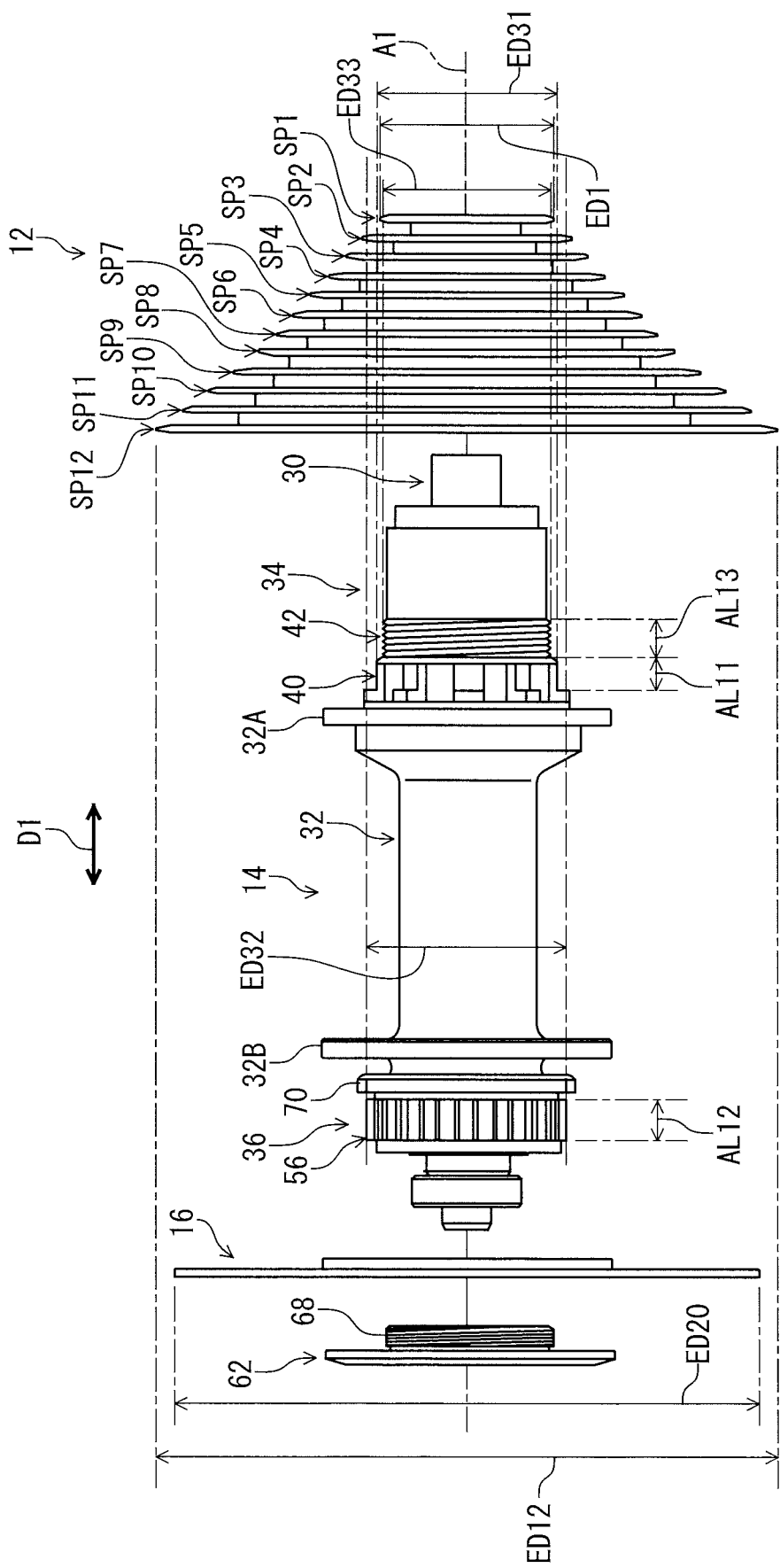
FIG. 2 is a rear view of the bicycle drive train assembly illustrated in FIG. 1.

As seen in FIG. 2, the bicycle sprocket assembly 12 includes at least ten sprockets. The bicycle sprocket assembly 12 includes a smallest sprocket SP1 and a largest sprocket SP12. The bicycle sprocket assembly 12 includes at least nine additional sprockets disposed between the smallest sprocket SP1 and the largest sprocket SP12 in the axial direction D1. The bicycle sprocket assembly 12 includes at least ten additional sprockets disposed between the smallest sprocket SP1 and the largest sprocket SP12 in the axial direction D1. In this embodiment, the bicycle sprocket assembly 12 includes ten additional sprockets SP2 to SP11 disposed between the smallest sprocket SP1 and the largest sprocket SP12 in the axial direction D1. However, a total number of sprockets of the bicycle sprocket assembly 12 is not limited to this embodiment. The smallest sprocket SP1 can also be referred to as a sprocket SP1. The largest sprocket SP12 can also be referred to as a sprocket SP12. The additional sprockets SP2 to SP11 can also be referred to as sprockets SP2 to SP11, respectively.

The smallest sprocket SP1 has a smallest-sprocket external diameter ED1. The largest sprocket SP12 has a largest-sprocket external diameter ED12. The largest-sprocket external diameter ED12 is larger than the smallest-sprocket external diameter ED1. The brake rotor 16 has a rotor external diameter ED20. The rotor external diameter ED20 is smaller than the largest-sprocket external diameter ED12. The rotor external diameter ED20 is larger than the smallest-sprocket external diameter ED1. However, the rotor external diameter ED20 can be equal to or larger than the largest-sprocket external diameter ED12. The rotor external diameter ED20 can be equal to or smaller than the smallest-sprocket external diameter ED1.

As seen in FIG. 2, the bicycle hub assembly 14 comprises a hub axle 30, a hub body 32, a sprocket support structure 34, and a brake-rotor support structure 36. The hub body 32 is rotatably supported on the hub axle 30 about a rotational center axis A1 of the bicycle hub assembly 14. The hub body 32 has a first body end 32A and a second body end 32B. The second body end 32B is opposite to the first body end 32A in an axial direction D1 with respect to the rotational center axis A1. In this embodiment, the first body end 32A is a right end of the hub body 32, and the second body end 32B is a left end of the hub body 32. However, the first body end 32A can be a left end, and the second body end 32B can be a right end.

Figure 3:
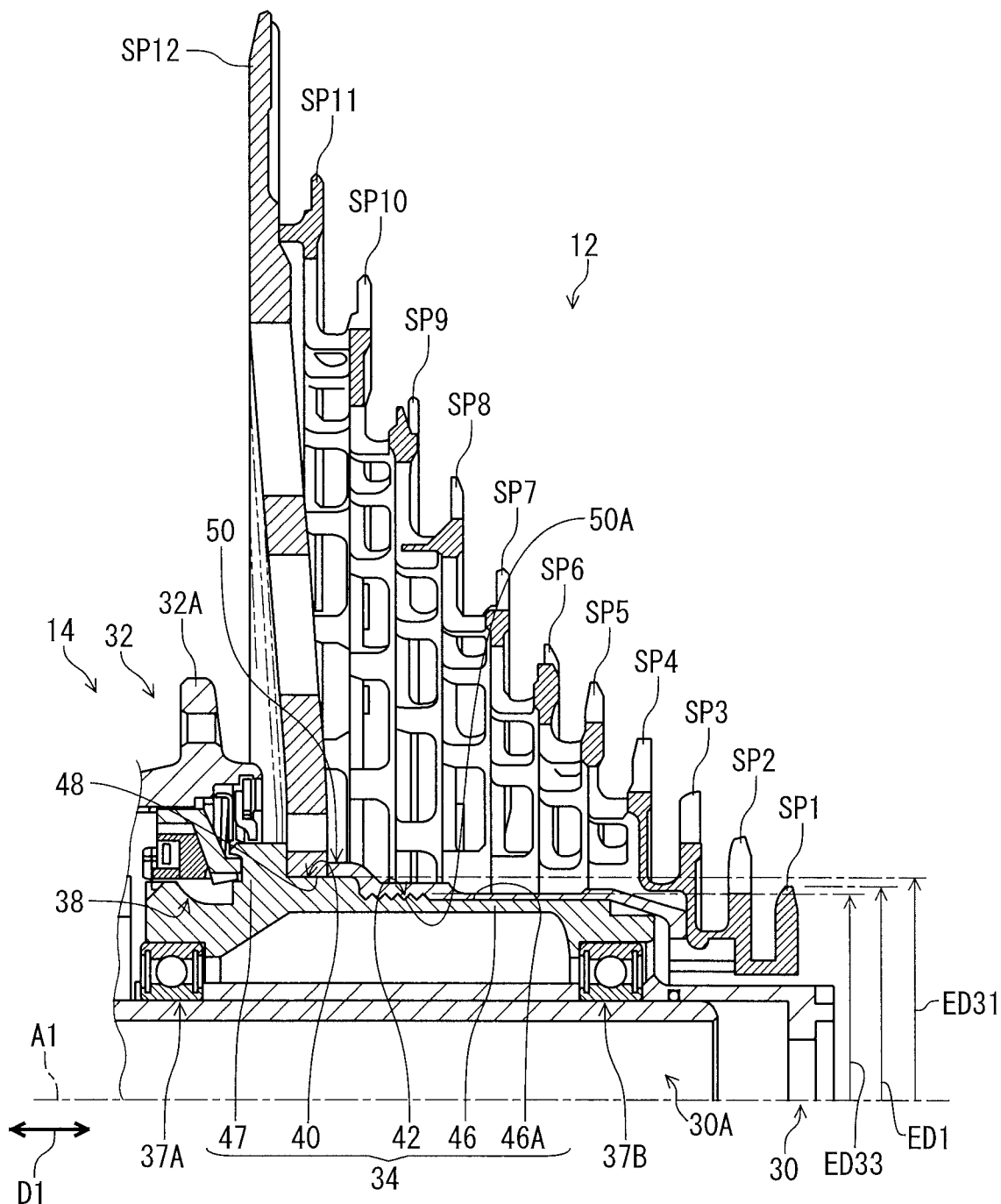
FIG. 3 is a cross-sectional view of a bicycle hub assembly and a bicycle sprocket assembly of the bicycle drive train assembly illustrated in FIG. 1.

The sprocket support structure 34 is configured to support the bicycle sprocket assembly 12. The sprocket support structure 34 is closer to the first body end 32A than the brake-rotor support structure 36 in the axial direction D1. The sprocket support structure 34 is rotatably mounted on the hub axle 30 about the rotational center axis A1. In this embodiment, as seen in FIG. 3, the bicycle hub assembly 14 comprises a first bearing 37A and a second bearing 37B. The first bearing 37A and the second bearing 37B are provided between the sprocket support structure 34 and the hub axle 30 to support rotatably the sprocket support structure 34 relative to the hub axle 30.

As seen in FIG. 2, the brake-rotor support structure 36 is configured to support the brake rotor 16. The brake-rotor support structure 36 is provided at the second body end 32B. The brake-rotor support structure 36 is rotatably mounted on the hub axle 30 about the rotational center axis A1. The brake-rotor support structure 36 is coupled to the hub body 32 to rotate integrally with the hub body 32 relative to the hub axle 30 about the rotational center axis A1. In this embodiment, the brake-rotor support structure 36 is integrally provided with the hub body 32 as a one-piece unitary member. However, the brake-rotor support structure 36 can be a separate member from the hub body 32.

As seen in FIG. 3, the sprocket support structure 34 is a separate member from the hub body 32. The bicycle hub assembly 14 comprises a ratchet structure 38. The sprocket support structure 34 is operatively coupled to the hub body 32 with the ratchet structure 38. The ratchet structure 38 is configured to couple the sprocket support structure 34 to the hub body 32 to rotate the sprocket support structure 34 along with the hub body 32 in one rotational direction during pedaling. The ratchet structure 38 is configured to allow the sprocket support structure 34 to rotate relative to the hub body 32 in the other rotational direction during coasting. The ratchet structure 38 includes structures which have been known in the bicycle field. Thus, they will not be described in detail here for the sake of brevity.

Figure 4:
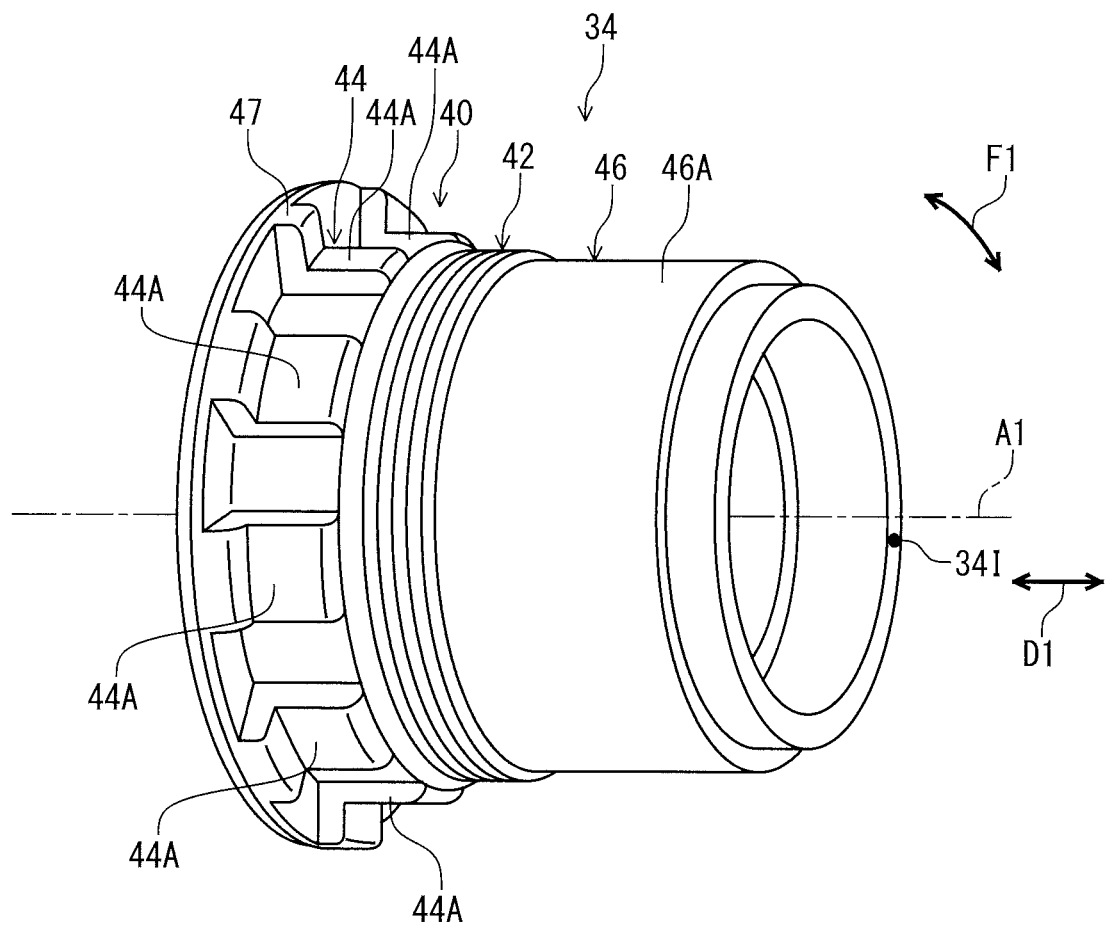
FIG. 4 is a perspective view of a sprocket support structure of the bicycle hub assembly of the bicycle drive train assembly illustrated in FIG. 1.

As seen in FIG. 4, the sprocket support structure 34 includes a first torque-transmitting profile 40 and a first externally-threaded portion 42. The first torque-transmitting profile 40 is configured to transmit a rotational force F1 between the sprocket support structure 34 and the bicycle sprocket assembly 12. The first torque-transmitting profile 40 includes a first splined portion 44. In this embodiment, the sprocket support structure 34 includes a base part 46 having a tubular shape. The first torque-transmitting profile 40 and the first externally-threaded portion 42 are provided on an outer peripheral surface 46A of the base part 46. The sprocket support structure 34 includes a sprocket stopper 47. The first torque-transmitting profile 40 is provided between the first externally-threaded portion 42 and the sprocket stopper 47 in the axial direction D1.

As seen in FIG. 3, the first splined portion 44 is configured to engage with a sprocket splined portion 48 of the bicycle sprocket assembly 12. In this embodiment, the largest sprocket SP12 includes the sprocket splined portion 48.

The bicycle hub assembly 14 further comprises a first lock member 50. The first externally-threaded portion 42 is configured to threadedly engage with a first internally-threaded portion 50A of the first lock member 50. The first lock member 50 is configured to prevent an axial movement of the bicycle sprocket assembly 12 relative to the sprocket support structure 34 in a state where the first lock member 50 is attached to the sprocket support structure 34.

The largest sprocket SP12 is provided between the first lock member 50 and the sprocket stopper 47 in the axial direction D1 in the state where the first lock member 50 is attached to the sprocket support structure 34. The first lock member 50 is rotatably coupled to the sprockets SP1 to SP12. The first lock member 50 is coupled to the sprockets SP1 to SP12 to move integrally with the sprockets SP1 to SP12 in the axial direction D1. In this embodiment, the bicycle hub assembly 14 comprises the first lock member 50. However, the bicycle sprocket assembly 12 can include the first lock member 50. In this embodiment, the sprockets SP1 to SP11 are integrally provided with each other as a one-piece unitary member, and the sprocket SP12 is a separate member from the sprockets SP1 to SP11. However, the sprocket SP12 can be integrally provided with the sprockets SP1 to SP11 as a one-piece unitary member. Namely, the bicycle sprocket assembly 12 can be a one-piece unitary member. Furthermore, at least one of the sprockets SP1 to SP11 can be a separate member from another of the sprockets SP1 to SP11.

As seen in FIG. 2, the first torque-transmitting profile 40 is closer to the first body end 32A than the first externally-threaded portion 42 in the axial direction D1. The first torque-transmitting profile 40 is provided between the first externally-threaded portion 42 and the first body end 32A in the axial direction D1. The first externally-threaded portion 42 is disposed axially outwardly from the first torque-transmitting profile 40 in the axial direction D1. The first torque-transmitting profile 40 is provided between the first externally-threaded portion 42 and the second body end 32B in the axial direction D1. However, the positions of the first torque-transmitting profile 40 and the first externally-threaded portion 42 are not limited to this embodiment.

Figure 5:
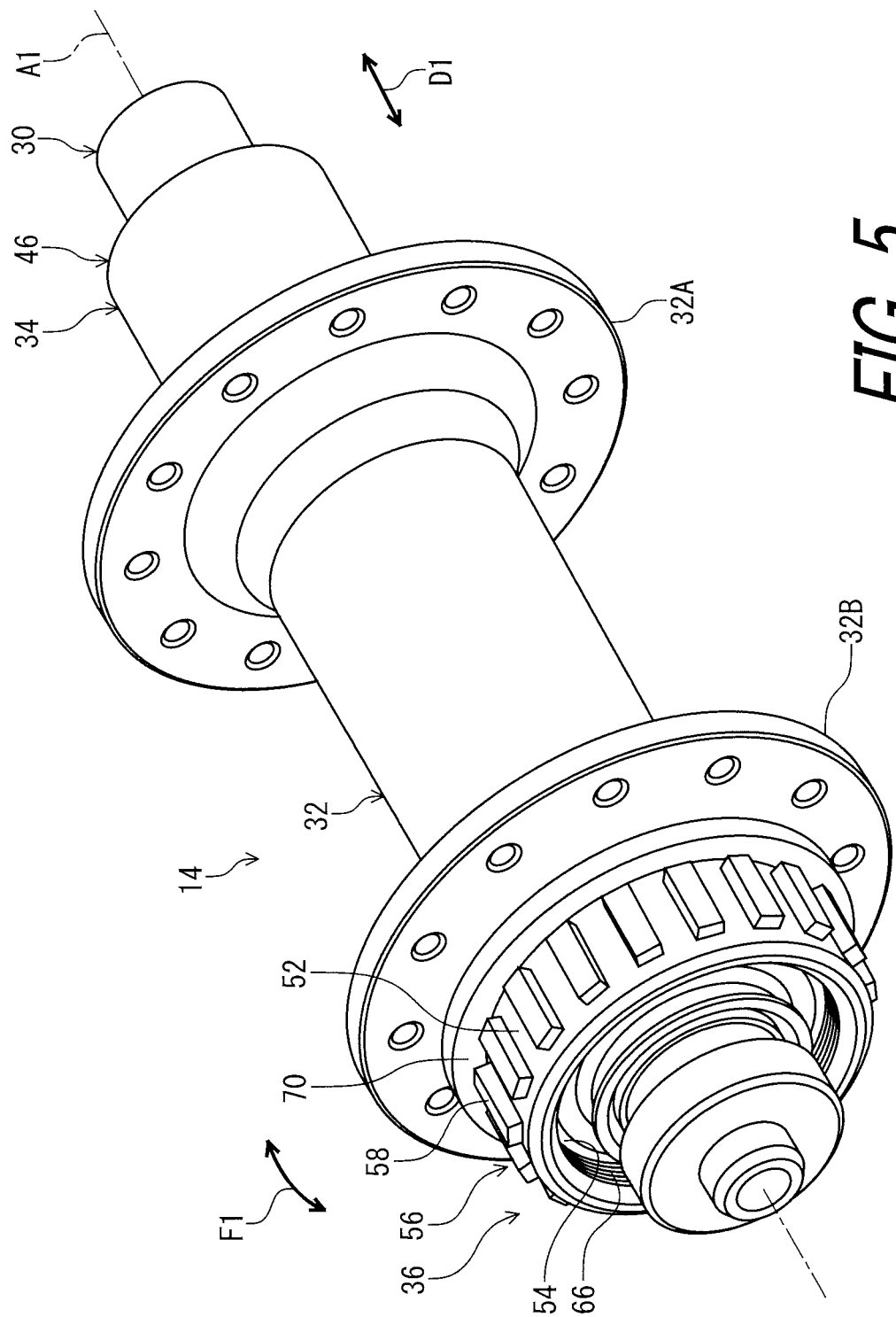
FIG. 5 is a perspective view of the bicycle hub assembly of the bicycle drive train assembly illustrated in FIG. 1.

As seen in FIG. 5, the brake-rotor support structure 36 includes a radially external surface 52, a radially internal surface 54, and a second torque-transmitting profile 56. The second torque-transmitting profile 56 is configured to transmit the rotational force F1 between the brake-rotor support structure 36 and the brake rotor 16. The second torque-transmitting profile 56 is provided on the radially external surface 52. The second torque-transmitting profile 56 includes a second splined portion 58.

Figure 6:
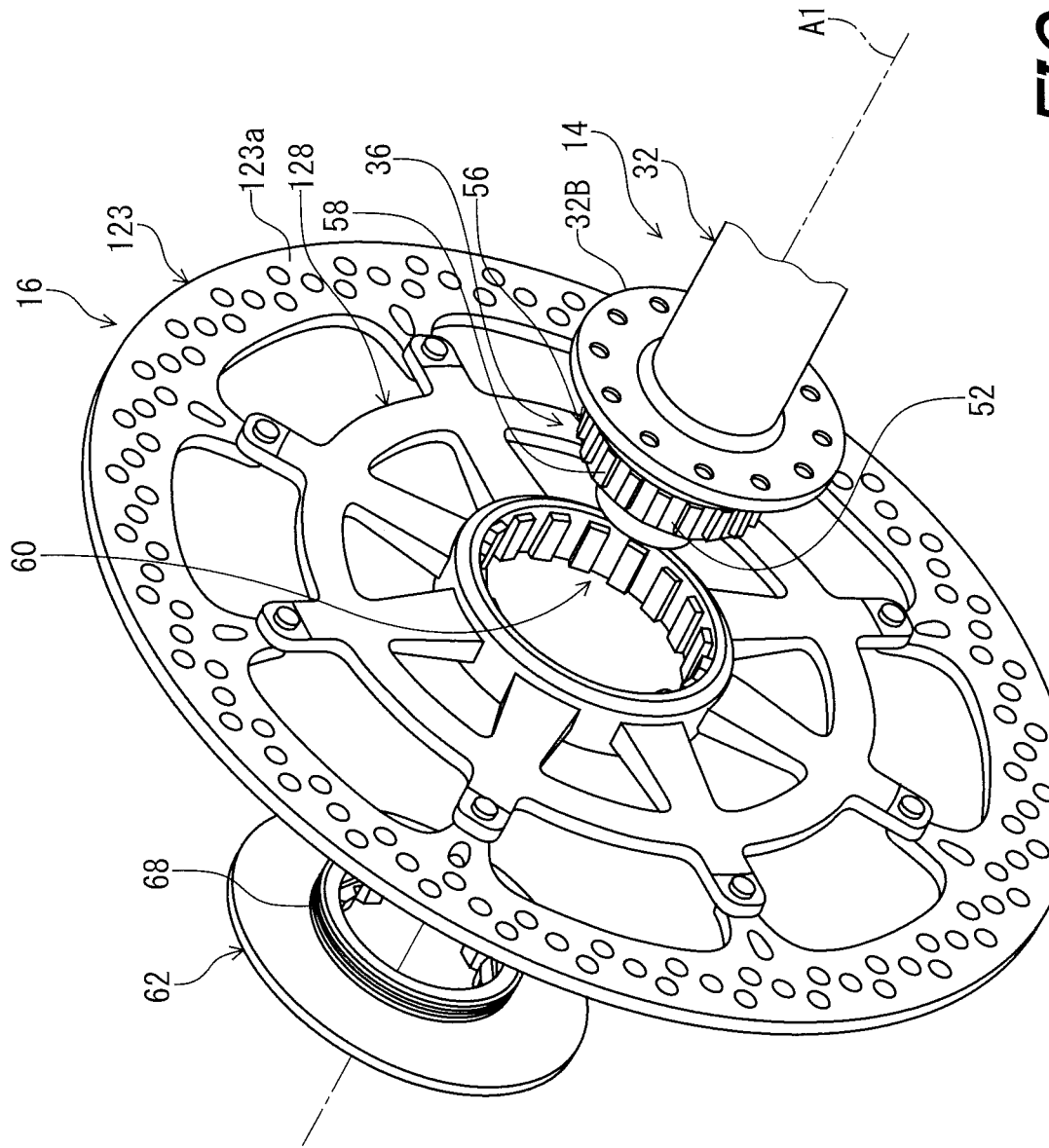
FIG. 6 is an exploded perspective view of the bicycle hub assembly and a brake rotor of the bicycle drive train assembly illustrated in FIG. 1.

As seen in FIG. 6, the second splined portion 58 is configured to engage with a rotor splined portion 60 of the brake rotor 16. The bicycle hub assembly 14 further comprises a second lock member 62. The second lock member 62 is configured to prevent an axial movement of the brake rotor 16 relative to the brake-rotor support structure 36 in a state where the second lock member 62 is attached to the brake-rotor support structure 36. The second lock member 62 is secured to the brake-rotor support structure 36.

As seen in FIG. 5, the brake-rotor support structure 36 includes a second internally-threaded portion 66 provided on the radially internal surface 54. As seen in FIG. 6, the second lock member 62 includes a second externally-threaded portion 68 configured to threadedly engage with the second internally-threaded portion 66 (FIG. 5) of the brake-rotor support structure 36.

As seen in FIG. 2, the brake-rotor support structure 36 includes a rotor stopper 70. The rotor stopper 70 is provided between the second torque-transmitting profile 56 and the second body end 32B in the axial direction D1. The second lock member 62 is secured to the brake-rotor support structure 36 to hold the brake rotor 16 between the rotor stopper 70 (FIG. 2) and the second lock member 62.

The first torque-transmitting profile 40 has a first external diameter ED31. The second torque-transmitting profile 56 has a second external diameter ED32. The second external diameter ED32 is larger than the first external diameter ED31. The first externally-threaded portion 42 has a third external diameter ED33. The third external diameter ED33 is smaller than the first external diameter ED31. The third external diameter ED33 is smaller than the second external diameter ED32. The second external diameter ED32 is larger than the smallest-sprocket external diameter ED1. However, the second external diameter ED32 can be equal to or smaller than the first external diameter ED31. The third external diameter ED33 can be equal to or larger than the second external diameter ED32.

In this embodiment, the first external diameter ED31 ranges from 34 mm to 35 mm. The second external diameter ED32 ranges from 35 mm to 36 mm. The third external diameter ED33 ranges from 31 mm to 33 mm. However, each of the ranges of the first external diameter ED31, the second external diameter ED32, and the third external diameter ED33 is not limited to this embodiment.

The first torque-transmitting profile 40 has a first axial length AL11. The second torque-transmitting profile 56 has a second axial length AL12. The second axial length AL12 is larger than the first axial length AL11. The first externally-threaded portion 42 has a third axial length AL13. The third axial length AL13 is larger than the first axial length AL11. The third axial length AL13 is smaller than the second axial length AL12. However, the second axial length AL12 can be equal to or smaller than the first axial length AL11. The third axial length AL13 can be equal to or smaller than the first axial length AL11. The third axial length AL13 can be equal to or larger than the second axial length AL12.

In this embodiment, the ratio of the first axial length AL11 to the second axial length AL12 ranges from 1 to 2. The first axial length AL11 ranges from 5 mm to 6 mm. The second axial length AL12 ranges from 10 mm to 11 mm. The third axial length AL13 ranges from 5.5 mm to 6.5 mm. However, each of the ranges of the first axial length AL11, the second axial length AL12, and the third axial length AL13 is not limited to this embodiment.

As seen in FIG. 7, the smallest sprocket SP1 has a first total tooth number TN1 that is equal to or smaller than 10. The largest sprocket SP12 has a second total tooth number TN12 that is equal to or larger than 46. The second total tooth number TN12 can be equal to or larger than 50. In this embodiment, the phrase "total tooth number" of a sprocket means a total number of teeth of the sprocket. The first total tooth number TN1 (i.e., a total number of teeth of the smallest sprocket SP1) is 10. The second total tooth number TN12 (i.e., a total number of teeth of the largest sprocket SP12) is 50. However, the first total tooth number TN1 and the second total tooth number TN12 are not limited to this embodiment. FIG. 7 shows a total tooth number of each of the additional sprockets SP2 to SP11. However, the total tooth number of each of the additional sprockets SP2 to SP11 is not limited to this embodiment.

The bicycle sprocket assembly 12 has an entire gear range equal to or higher than 350%. The entire gear range of the bicycle sprocket assembly 12 is equal to or higher than 400%. The entire gear range of the bicycle sprocket assembly 12 is defined as a ratio of the second total tooth number TN12 of the largest sprocket SP12 to the first total tooth number TN1 of the smallest sprocket SP1. In this embodiment, the entire gear range of the bicycle sprocket assembly 12 is equal to 480%. However, the entire gear range can be lower than 350%.

The bicycle sprocket assembly 12 has an average percentage gear stage step ranging from 15% to 30%. The average percentage gear stage step of the bicycle sprocket assembly 12 ranges from 20% to 30%. The bicycle sprocket assembly 12 has individual percentage gear stage steps ranging from 15% to 35%. The average percentage gear stage step of the bicycle sprocket assembly 12 is defined as an average of individual percentage gear stage steps of the sprockets SP1 to SP12. The individual percentage gear stage step is defined as a ratio of difference between a total number of teeth of a larger sprocket and a total number of teeth of a smaller sprocket axially directly adjacent to the larger sprocket to the total number of teeth of the smaller sprocket. For example, the individual percentage gear stage step between the sprockets SP12 and SP11 is defined as a ratio of difference (6) between the total tooth number (48) of the sprocket SP12 and the total tooth number (42) of the sprocket SP11 to the total tooth number (42) of the sprocket SP11. The average percentage gear stage step can be lower than 15% and can be higher than 30%. The individual percentage gear stage steps can be lower than 15% and can be higher than 35%.

Figure 8:
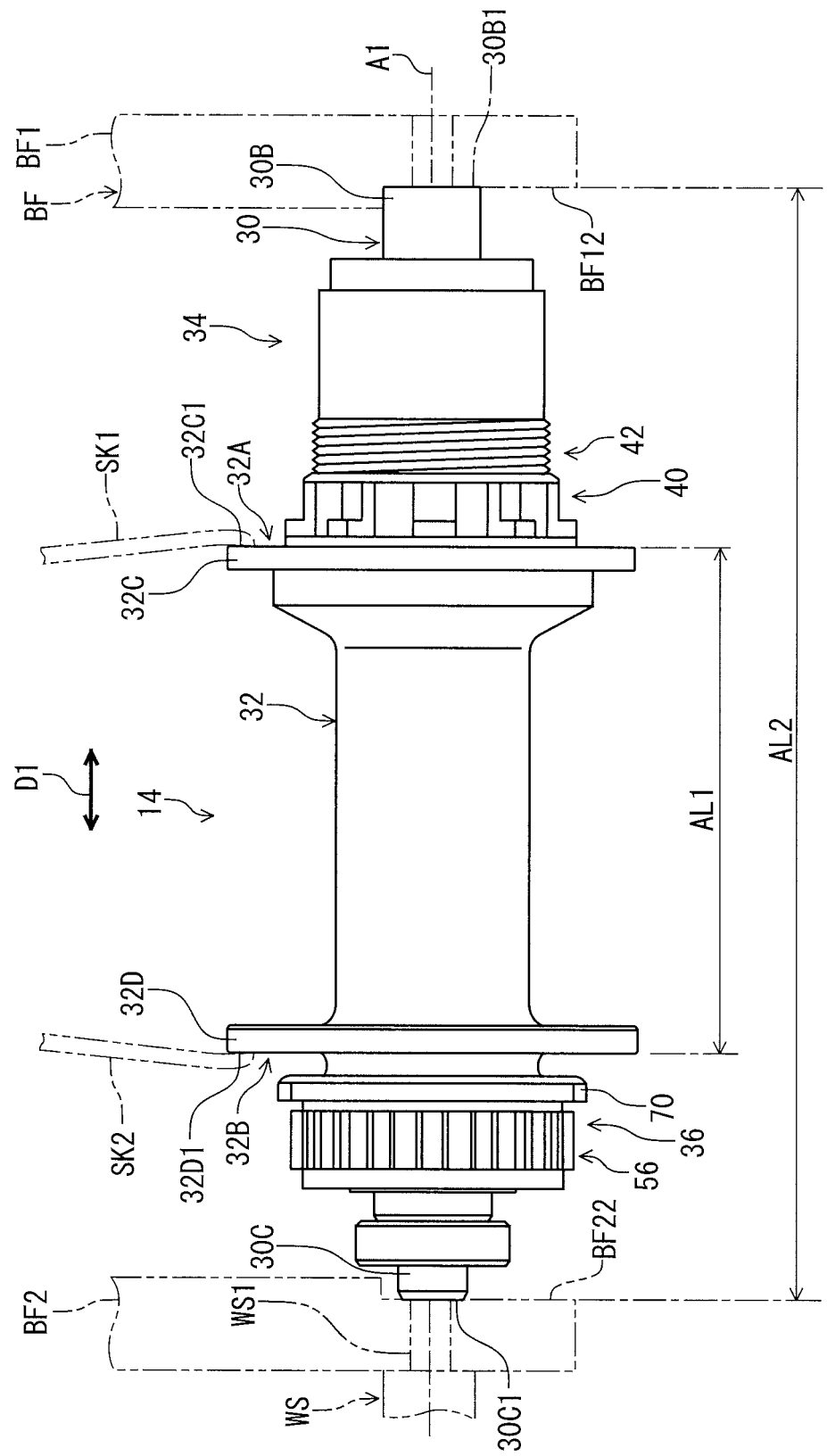
FIG. 8 is a rear view of the bicycle hub assembly of the bicycle drive train assembly illustrated in FIG. 1.

As seen in FIG. 8, the bicycle hub assembly 14 is secured to a bicycle frame BF with a wheel securing structure WS. As seen in FIG. 3, the hub axle 30 has a through hole 30A. As seen in FIG. 8, a securing rod WS1 of a wheel securing structure WS extends through the through hole 30A (FIG. 3) of the hub axle 30. The hub axle 30 includes a first axle end 30B and a second axle end 30C. The hub axle 30 extends between the first axle end 30B and the second axle end 30C along the rotational center axis A1. The first axle end 30B is secured to a first frame BF1 of the bicycle frame BF. The second axle end 30C is secured to a second frame BF2 of the bicycle frame BF. The hub axle 30 is held between the first frame BF1 and the second frame BF2 with the wheel securing structure WS. The wheel securing structure WS includes a structure which has been known in the bicycle filed. Thus, it will not be described in detail here for the sake of brevity.

As seen in FIG. 8, the hub body 32 includes a first spoke-mounting portion 32C and a second spoke-mounting portion 32D. A plurality of first spokes SK1 is coupled to the first spoke-mounting portion 32C. A plurality of second spokes SK2 is coupled to the second spoke-mounting portion 32D. The term "spoke-mounting portion", as used herein, encompasses configurations in which the spoke-mounting opening has a flange-like shape so that the spoke mounting portion extends radially outwardly with respect to the rotational center axis of the bicycle hub assembly as seen in FIG. 8, and configurations in which the spoke mounting portion is an opening directly formed on a radially outer peripheral surface of the hub body.

The first spoke-mounting portion 32C is provided at the first body end 32A. The second spoke-mounting portion 32D is provided at the second body end 32B. The second spoke-mounting portion 32D is spaced apart from the first spoke-mounting portion 32C in the axial direction D1. The first spoke-mounting portion 32C is provided between the sprocket support structure 34 and the second spoke-mounting portion 32D in the axial direction D1. The second spoke-mounting portion 32D is provided between the first spoke-mounting portion 32C and the brake-rotor support structure 36 in the axial direction D1.

The first spoke-mounting portion 32C has a first axially outermost part 32C1. The second spoke-mounting portion 32D has a second axially outermost part 32D1. The first axially outermost part 32C1 includes a surface facing toward the first frame BF1 in the axial direction D1 in a state where the bicycle hub assembly 14 is mounted to the bicycle frame BF. The second axially outermost part 32D1 includes a surface facing toward the second frame BF2 in the axial direction D1 in a state where the bicycle hub assembly 14 is mounted to the bicycle frame BF.

The hub body 32 includes a first axial distance AL1. The first axial distance AL1 is defined between the first axially outermost part 32C1 of the first spoke-mounting portion 32C and the second axially outermost part 32D1 of the second spoke-mounting portion 32D in the axial direction D1 with respect to the rotational center axis A1. The first axial distance AL1 can be equal to or larger than 55 mm. The first axial distance AL1 can be equal to or smaller than 80 mm. The first axial distance AL1 can be equal to or larger than 60 mm. The first axial distance AL1 can be equal to or larger than 65 mm. The first axial distance AL1 can be 67 mm. However, the first axial distance AL1 is not limited to this embodiment and the above ranges. Examples of the first axial distance AL1 include 55.7 mm, 62.3 mm, and 67 mm.

As seen in FIG. 8, the hub axle 30 includes a first axial frame abutment surface 30B1 and a second axial frame abutment surface 30C1. The first axial frame abutment surface 30B1 is configured to abut against a first part BF12 of the bicycle frame BF in the axial direction D1 in the state where the bicycle hub assembly 14 is mounted to the bicycle frame BF. The second axial frame abutment surface 30C1 is configured to abut against a second part BF22 of the bicycle frame BF in the axial direction D1 in the state where the bicycle hub assembly 14 is mounted to the bicycle frame BF. The first axial frame abutment surface 30B1 is positioned closer to the sprocket support structure 34 than the second axial frame abutment surface 30C1 in the axial direction D1. The sprocket support structure 34 is provided between the first axial frame abutment surface 30B1 and the second axial frame abutment surface 30C1 in the axial direction D1.

The hub axle 30 includes a second axial distance AL2. The second axial distance AL2 is defined between the first axial frame abutment surface 30B1 and the second axial frame abutment surface 30C1 in the axial direction D1. The second axial distance AL2 can be equal to or larger than 140 mm. The second axial distance AL2 can be equal to or smaller than 160 mm. The second axial distance AL2 can be equal to or larger than 145 mm. The second axial distance AL2 can be equal to or larger than 147 mm. The second axial distance AL2 can be 148 mm. However, the second axial distance AL2 is not limited to this embodiment and the above ranges. Examples of the second axial distance AL2 include 142 mm, 148 mm, and 157 mm.

A ratio of the first axial distance AL1 to the second axial distance AL2 can be equal to or larger than 0.3. The ratio of the first axial distance AL1 to the second axial distance AL2 can be equal to or larger than 0.4. The ratio of the first axial distance AL1 to the second axial distance AL2 can be equal to or smaller than 0.5. For example, the ratio of the first axial distance AL1 (67 mm) to the second axial distance AL2 (148 mm) is approximately 0.45. However, the ratio of first axial distance AL1 to the second axial distance AL2 is not limited to this embodiment and the above ranges. Examples of the ratio of the first axial distance AL1 to the second axial distance AL2 include approximately 0.42 (AL1 is 62.3 mm and AL2 is 148 mm), or include approximately 0.39 (AL1 is 55.7 mm and AL2 is 142 mm).

Figure 9:
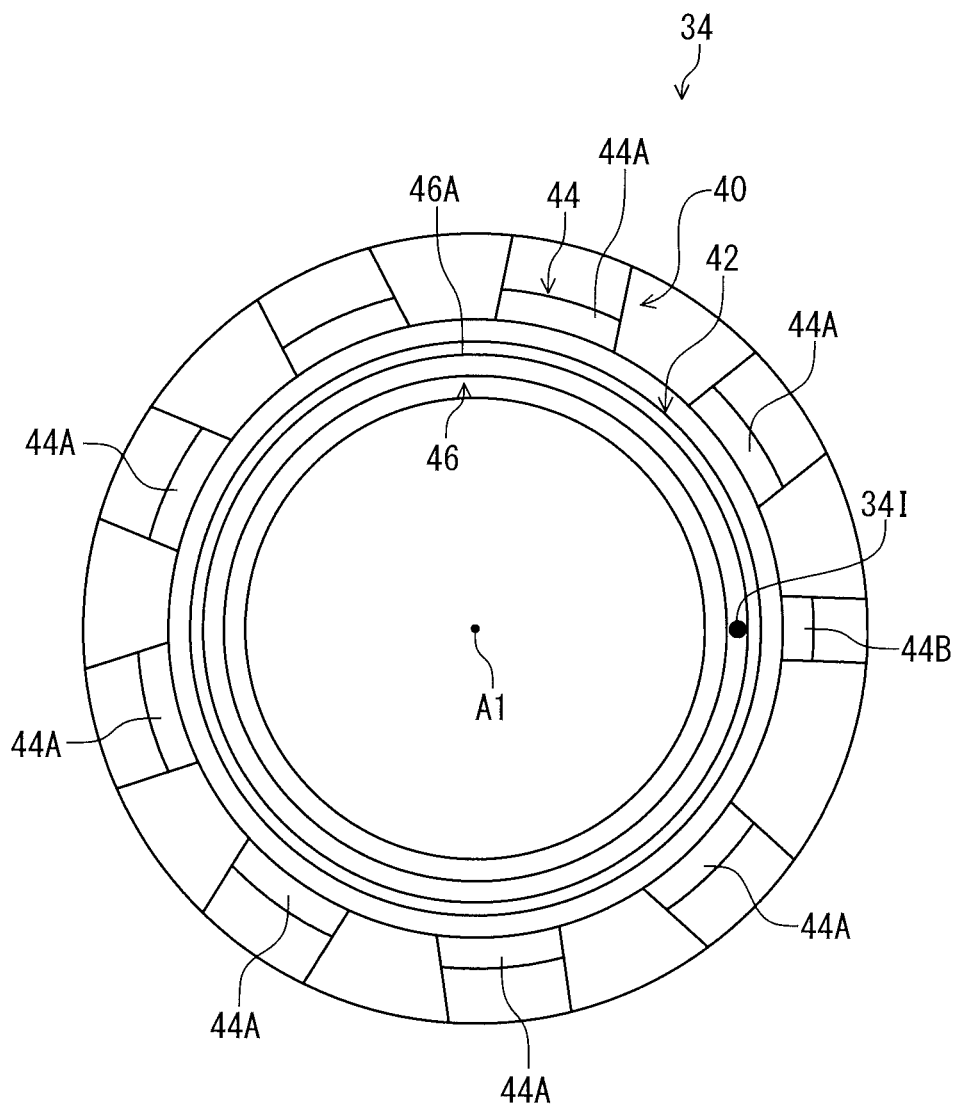
FIG. 9 is a side elevational view of the sprocket support structure illustrated in FIG. 4.

As seen in FIGS. 4 and 9, the sprocket support structure 34 includes a hub indicator 34I provided at an axial end of the base part 46. The first splined portion 44 includes a plurality of spline teeth 44A and an additional spline tooth 44B. The additional spline tooth 44B has a circumferential width different from a circumferential width of the spline tooth 44A. The hub indicator 34I is provided closer to the additional spline tooth 44B than to the spline teeth 44A. In this embodiment, the hub indicator 34I includes a dot. However, the hub indicator 34I can include other shapes such as a triangle and a line. Further, the hub indicator 34I can be a separate member that is attached to the sprocket support structure 34, e.g. with a bonding structure such as an adhesive agent. The position of the hub indicator 34I is not limited to this embodiment.

Figure 10:
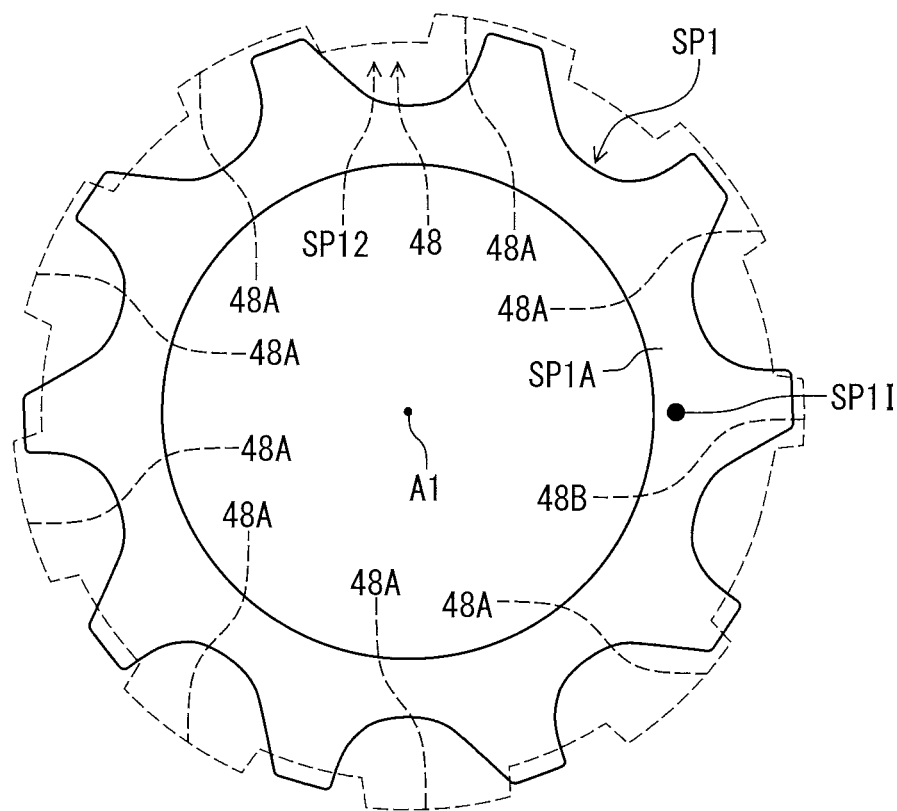
FIG. 10 is a side elevational view of a sprocket of the bicycle sprocket assembly of the bicycle drive train assembly illustrated in FIG. 1.

As seen in FIG. 10, the sprocket SP1 includes a sprocket indicator SP1I provided at an axial end of a sprocket body SP1A of the sprocket SP1. The sprocket splined portion 48 includes a plurality of spline grooves 48A and an additional spline groove 48B. The additional spline groove 48B has a circumferential width different from a circumferential width of the spline groove 48A. The spline tooth 44A (FIG. 9) of the sprocket support structure 34 is provided in the spline groove 48A of the sprocket splined portion 48. The additional spline tooth 44B (FIG. 9) of the sprocket support structure 34 is provided in the additional spline groove 48B of the sprocket splined portion 48. In this embodiment, the sprocket indicator SP1I includes a dot. However, the sprocket indicator SP1I can include other shapes such as a triangle and a line. Further, the sprocket indicator SP1I can be a separate member that is attached to the sprocket SP1, e.g. with a bonding structure such as an adhesive agent. The position of the sprocket indicator SP1I is not limited to this embodiment. The sprocket indicator SP1I can be provided to any one of other sprockets SP2 to SP12. The sprocket indicator SP1I can also be provided to the sprocket support.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hub assembly comprising:
   a hub axle;
   a hub body rotatably supported on the hub axle about a rotational center axis of the bicycle hub assembly, the hub body having a first body end and a second body end opposite to the first body end in an axial direction with respect to the rotational center axis;
   a sprocket support structure including:
      a first torque-transmitting profile configured to transmit a rotational force between the sprocket support structure and a bicycle sprocket assembly; and
      a first externally-threaded portion configured to threadedly engage with a first internally-threaded portion of a first lock member, the first torque-transmitting profile being closer to the first body end than the first externally-threaded portion in the axial direction; and
   a brake-rotor support structure including:
      a radially external surface;
      a radially internal surface; and
      a second torque-transmitting profile configured to transmit a rotational force between the brake-rotor support structure and a brake rotor, the second torque-transmitting profile being provided on the radially external surface, wherein
   the first torque-transmitting profile has a first external diameter, and
   the second torque-transmitting profile has a second external diameter that is larger than the first external diameter.

2. The bicycle hub assembly according to claim 1, further comprising:
   the first lock member configured to prevent an axial movement of the bicycle sprocket assembly relative to the sprocket support structure in a state where the first lock member is attached to the sprocket support structure.

3. The bicycle hub assembly according to claim 1, further comprising:
   a second lock member configured to prevent an axial movement of the brake rotor relative to the brake-rotor support structure in a state where the second lock member is attached to the brake-rotor support structure.

4. The bicycle hub assembly according to claim 3, wherein
   the brake-rotor support structure includes a second internally-threaded portion provided on the radially internal surface, and
   the second lock member includes a second externally-threaded portion configured to threadedly engage with the second internally-threaded portion of the brake-rotor support structure.

5. The bicycle hub assembly according to claim 1, wherein
   the first torque-transmitting profile includes a first splined portion configured to engage with a sprocket splined portion of the bicycle sprocket assembly.

6. The bicycle hub assembly according to claim 1, wherein
   the second torque-transmitting profile includes a second splined portion configured to engage with a rotor splined portion of the brake rotor.

7. The bicycle hub assembly according to claim 1, wherein
   the first externally-threaded portion has a third external diameter that is smaller than the first external diameter.

8. The bicycle hub assembly according to claim 1, wherein
   the first external diameter that ranges from 34 mm to 35 mm.

9. The bicycle hub assembly according to claim 1, wherein
   the second external diameter that ranges from 35 mm to 36 mm.

10. The bicycle hub assembly according to claim 1, wherein
    the first torque-transmitting profile has a first axial length, and
    the second torque-transmitting profile has a second axial length that is larger than the first axial length.

11. The bicycle hub assembly according to claim 10, wherein
    the first externally-threaded portion has a third axial length that is larger than the first axial length.

12. The bicycle hub assembly according to claim 1, wherein
    the first torque-transmitting profile has a first axial length,
    the second torque-transmitting profile has a second axial length, and the ratio of the first axial length to the second axial length ranges from 1 to 2.

13. The bicycle hub assembly according to claim 1, wherein
the first torque-transmitting profile has a first axial length that ranges from 5 mm to 6 mm.

14. The bicycle hub assembly according to claim 1, wherein
the second torque-transmitting profile has a second axial length that ranges from 10 mm to 11 mm.

15. The bicycle hub assembly according to claim 1, wherein
the sprocket support structure is closer to the first body end than the brake-rotor support structure in the axial direction.

16. A bicycle drive train assembly comprising:
a bicycle sprocket assembly including:
a smallest sprocket having a first total tooth number that is equal to or smaller than 10; and
a largest sprocket having a second total tooth number that is equal to or larger than 46; and
a bicycle hub assembly including:
a hub axle;
a hub body rotatably supported on the hub axle about a rotational center axis of the bicycle hub assembly, the hub body having a first body end and a second body end opposite to the first body end in an axial direction with respect to the rotational center axis;
a sprocket support structure configured to support the bicycle sprocket assembly, the sprocket support structure including a first torque-transmitting profile configured to transmit a rotational force between the sprocket support structure and the bicycle sprocket assembly, the first torque-transmitting profile having a first external diameter; and
a brake-rotor support structure including:
a radially external surface;
a radially internal surface; and
a second torque-transmitting profile configured to transmit a rotational force between the brake-rotor support structure and a brake rotor, the second torque-transmitting profile being provided on the radially external surface, the second torque-transmitting profile having a second external diameter, wherein
the second external diameter is larger than the first external diameter.

17. The bicycle drive train assembly according to claim 16, wherein
the sprocket support structure includes a first externally-threaded portion configured to threadedly engage with a first internally-threaded portion of a first lock member, and
the first torque-transmitting profile is closer to the first body end than the first externally-threaded portion in the axial direction.

18. The bicycle drive train assembly according to claim 16, wherein
the bicycle hub assembly comprises the first lock member configured to prevent an axial movement of the bicycle sprocket assembly relative to the sprocket support structure in a state where the first lock member is attached to the sprocket support structure.

19. The bicycle drive train assembly according to claim 16, wherein
the bicycle hub assembly comprises a second lock member configured to prevent an axial movement of the brake rotor relative to the brake-rotor support structure in a state where the second lock member is attached to the brake-rotor support structure.

20. The bicycle drive train assembly according to claim 19, wherein
the brake-rotor support structure includes a second internally-threaded portion provided on the radially internal surface, and
the second lock member includes a second externally-threaded portion configured to threadedly engage with the second internally-threaded portion of the brake-rotor support structure.

21. The bicycle drive train assembly according to claim 16, wherein
the first torque-transmitting profile includes a first splined portion configured to engage with a sprocket splined portion of the bicycle sprocket assembly.

22. The bicycle drive train assembly according to claim 16, wherein
the second torque-transmitting profile includes a second splined portion configured to engage with a rotor splined portion of the brake rotor.

23. The bicycle drive train assembly according to claim 16, wherein
the second total tooth number is equal to or larger than 50.

24. The bicycle drive train assembly according to claim 16, wherein
the bicycle sprocket assembly includes at least nine additional sprockets disposed between the smallest sprocket and the largest sprocket in the axial direction.

25. The bicycle drive train assembly according to claim 16, wherein
the bicycle sprocket assembly includes at least ten additional sprockets disposed between the smallest sprocket and the largest sprocket in the axial direction.

26. The bicycle drive train assembly according to claim 16, wherein
the sprocket support structure is closer to the first body end than the brake-rotor support structure in the axial direction.

27. A bicycle drive train assembly comprising:
a bicycle sprocket assembly including at least ten sprockets, the bicycle sprocket assembly having:
an entire gear range equal to or higher than 350%; and
an average percentage gear stage step ranging from 15% to 30%; and
a bicycle hub assembly including:
a hub axle;
a hub body rotatably supported on the hub axle about a rotational center axis of the bicycle hub assembly, the hub body having a first body end and a second body end opposite to the first body end in an axial direction with respect to the rotational center axis;
a sprocket support structure configured to support the bicycle sprocket assembly, the sprocket support structure including a first torque-transmitting profile configured to transmit a rotational force between the sprocket support structure and the bicycle sprocket assembly, the first torque-transmitting profile having a first external diameter; and
a brake-rotor support structure including:
a radially external surface;
a radially internal surface; and
a second torque-transmitting profile configured to transmit a rotational force between the brake-rotor support structure and a brake rotor, the second torque-transmitting profile being provided on the radially external surface, the second torque-transmitting profile having a second external diameter, wherein
the second external diameter is larger than the first external diameter.

28. The bicycle drive train assembly according to claim 27, wherein
the sprocket support structure includes a first externally-threaded portion configured to threadedly engage with a first internally-threaded portion of a first lock member, and
the first externally-threaded portion is disposed axially outwardly from the first torque-transmitting profile in the axial direction.

29. The bicycle drive train assembly according to claim 27, wherein
the bicycle hub assembly comprises the first lock member configured to prevent an axial movement of the bicycle sprocket assembly relative to the sprocket support structure in a state where the first lock member is attached to the sprocket support structure.

30. The bicycle drive train assembly according to claim 27, wherein
the bicycle hub assembly comprises a second lock member configured to prevent an axial movement of the brake rotor relative to the brake-rotor support structure in a state where the second lock member is attached to the brake-rotor support structure.

31. The bicycle drive train assembly according to claim 30, wherein
the brake-rotor support structure includes a second internally-threaded portion provided on the radially internal surface, and
the second lock member includes a second externally-threaded portion configured to threadedly engage with the second internally-threaded portion of the brake-rotor support structure.

32. The bicycle drive train assembly according to claim 27, wherein
the first torque-transmitting profile includes a first splined portion configured to engage with a sprocket splined portion of the bicycle sprocket assembly.

33. The bicycle drive train assembly according to claim 27, wherein
the second torque-transmitting profile includes a second splined portion configured to engage with a rotor splined portion of the brake rotor.

34. The bicycle drive train assembly according to claim 27, wherein
the entire gear range of the bicycle sprocket assembly is equal to or higher than 400%.

35. The bicycle drive train assembly according to claim 27, wherein
the average percentage gear stage step of the bicycle sprocket assembly ranges from 20% to 30%.

36. The bicycle drive train assembly according to claim 27, wherein
the bicycle sprocket assembly has individual percentage gear stage steps ranging from 15% to 35%.

37. The bicycle drive train assembly according to claim 27, wherein
the sprocket support structure is closer to the first body end than the brake-rotor support structure in the axial direction.

38. A bicycle drive train assembly comprising:
a bicycle sprocket assembly including a smallest sprocket having a smallest-sprocket external diameter; and
a bicycle hub assembly including:
a hub axle;
a hub body rotatably supported on the hub axle about a rotational center axis of the bicycle hub assembly, the hub body having a first body end and a second body end opposite to the first body end in an axial direction with respect to the rotational center axis;
a sprocket support structure configured to support the bicycle sprocket assembly, the sprocket support structure including a first torque-transmitting profile configured to transmit a rotational force between the sprocket support structure and the bicycle sprocket assembly, the first torque-transmitting profile having a first external diameter; and
a brake-rotor support structure including:
a radially external surface;
a radially internal surface; and
a second torque-transmitting profile configured to transmit a rotational force between the brake-rotor support structure and a brake rotor, the second torque-transmitting profile being provided on the radially external surface and having a second external diameter that is larger than the smallest-sprocket external diameter.

39. The bicycle drive train assembly according to claim 38, wherein
the sprocket support structure includes a first externally-threaded portion configured to threadedly engage with a first internally-threaded portion of a first lock member, and
the first externally-threaded portion is disposed axially outwardly from the first torque-transmitting profile in the axial direction.

40. The bicycle drive train assembly according to claim 38, wherein
the bicycle hub assembly comprises the first lock member configured to prevent an axial movement of the bicycle sprocket assembly relative to the sprocket support structure in a state where the first lock member is attached to the sprocket support structure.

41. The bicycle drive train assembly according to claim 38, wherein
the bicycle hub assembly comprises a second lock member configured to prevent an axial movement of the brake rotor relative to the brake-rotor support structure in a state where the second lock member is attached to the brake-rotor support structure.

42. The bicycle drive train assembly according to claim 41, wherein
the brake-rotor support structure includes a second internally-threaded portion provided on the radially internal surface, and
the second lock member includes a second externally-threaded portion configured to threadedly engage with the second internally-threaded portion of the brake-rotor support structure.

43. The bicycle drive train assembly according to claim 38, wherein
the first torque-transmitting profile includes a first splined portion configured to engage with a sprocket splined portion of the bicycle sprocket assembly.

44. The bicycle drive train assembly according to claim 38, wherein
the second torque-transmitting profile includes a second splined portion configured to engage with a rotor splined portion of the brake rotor.

45. The bicycle drive train assembly according to claim 38, wherein
the second external diameter is larger than the first external diameter.

46. The bicycle drive train assembly according to claim 38, wherein
the sprocket support structure is closer to the first body end than the brake-rotor support structure in the axial direction.

47. A bicycle drive train assembly comprising:
a bicycle sprocket assembly including a largest sprocket having a largest-sprocket external diameter and a smallest sprocket having a smallest-sprocket external diameter;
a brake rotor having a rotor external diameter; and
a bicycle hub assembly including:
  a hub axle;
  a hub body rotatably supported on the hub axle about a rotational center axis of the bicycle hub assembly, the hub body having a first body end and a second body end opposite to the first body end in an axial direction of the rotational center axis;
  a sprocket support structure configured to support the bicycle sprocket assembly, the sprocket support structure including a first torque-transmitting profile configured to transmit a rotational force between the sprocket support structure and the bicycle sprocket assembly; and
  a brake-rotor support structure including:
    a radially external surface;
    a radially internal surface; and
    a second torque-transmitting profile configured to transmit a rotational force between the brake-rotor support structure and the brake rotor, the second torque-transmitting profile being provided on the radially external surface; and
the rotor external diameter being equal to or larger than the smallest-sprocket external diameter, and
the rotor external diameter being smaller than the largest-sprocket external diameter.

48. The bicycle drive train assembly according to claim 47, wherein
the sprocket support structure includes a first externally-threaded portion configured to threadedly engage with a first internally-threaded portion of a first lock member, and
the first externally-threaded portion is disposed axially outwardly from the first torque-transmitting profile in the axial direction.

49. The bicycle drive train assembly according to claim 47, wherein
the bicycle hub assembly comprises the first lock member configured to prevent an axial movement of the bicycle sprocket assembly relative to the sprocket support structure in a state where the first lock member is attached to the sprocket support structure.

50. The bicycle drive train assembly according to claim 47, wherein
the bicycle hub assembly comprises a second lock member configured to prevent an axial movement of the brake rotor relative to the brake-rotor support structure in a state where the second lock member is attached to the brake-rotor support structure.

51. The bicycle drive train assembly according to claim 50, wherein
the brake-rotor support structure includes a second internally-threaded portion provided on the radially internal surface, and
the second lock member includes a second externally-threaded portion configured to threadedly engage with the second internally-threaded portion of the sprocket support structure.

52. The bicycle drive train assembly according to claim 47, wherein
the first torque-transmitting profile includes a first splined portion configured to engage with a sprocket splined portion of the bicycle sprocket assembly.

53. The bicycle drive train assembly according to claim 47, wherein
the second torque-transmitting profile includes a second splined portion configured to engage with a rotor splined portion of the brake rotor.

54. The bicycle drive train assembly according to claim 47, wherein
the sprocket support structure is closer to the first body end than the brake-rotor support structure in the axial direction.

* * * * *